US012716627B2

(12) United States Patent
Kawashima et al.

(10) Patent No.: US 12,716,627 B2
(45) Date of Patent: Aug. 25, 2026

(54) ELECTRIC EXPANSION VALVE AND REFRIGERATION CYCLE DEVICE

(71) Applicant: DENSO CORPORATION, Kariya-city (JP)

(72) Inventors: Hiroyuki Kawashima, Kariya-city (JP); Takafumi Matsumoto, Kariya-city (JP); Riku Ouchi, Kariya-city (JP); Hiroto Inoue, Kariya-city (JP); Shigeji Oishi, Kariya-city (JP); Ryu Fukushima, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/174,145

(22) Filed: Apr. 9, 2025

(65) Prior Publication Data

US 2025/0237417 A1 Jul. 24, 2025

Related U.S. Application Data

(63) Continuation of application No. PCT/JP2023/033395, filed on Sep. 13, 2023.

(30) Foreign Application Priority Data

Oct. 14, 2022 (JP) ................................ 2022-165362

(51) Int. Cl.
*F25B 41/35* (2021.01)
*F16K 1/32* (2006.01)

(Continued)

(52) U.S. Cl.
CPC ................ *F25B 41/35* (2021.01); *F16K 1/32* (2013.01); *F25B 41/31* (2021.01); *F25B 41/345* (2021.01); *F16K 31/04* (2013.01); *F25B 2341/06* (2013.01)

(58) Field of Classification Search
CPC ........ F25B 41/35; F25B 41/31; F25B 41/345; F25B 2341/06; F16K 1/32; F16K 31/04

(Continued)

(56) References Cited

U.S. PATENT DOCUMENTS 5,407,173 A * 4/1995 Smith ....................... F16K 1/14 251/86
5,735,501 A * 4/1998 Maurer .................. F16K 3/316 251/327

(Continued)

FOREIGN PATENT DOCUMENTS

JP 5022960 B2 9/2012
JP 2020-012528 A 1/2020

*Primary Examiner* — John Bastianelli

(74) *Attorney, Agent, or Firm* — Harness, Dickey & Pierce, P.L.C.

(57) ABSTRACT

An electric expansion valve includes a drive unit, an output shaft, a main body, a valve body, and a joint portion. The drive unit receives supply of electric power and generates drive force to rotate and translate the output shaft. The main body includes a first inflow/outflow port, a second inflow/outflow port, a valve chamber, and a valve seat. The valve chamber is disposed in a refrigerant passage connecting the first inflow/outflow port and the second inflow/outflow port. The valve seat is disposed inside the valve chamber. The valve body is disposed within the valve chamber to open and close an opening of the valve seat. The joint portion connects an end of the output shaft and the valve body to be integrally displaceable.

2 Claims, 11 Drawing Sheets

(51) Int. Cl.

| | |
|---|---|
| ***F25B 41/31*** | (2021.01) |
| ***F25B 41/345*** | (2021.01) |
| *F16K 31/04* | (2006.01) |

(58) Field of Classification Search
USPC .......................................................... 251/86
See application file for complete search history.

(56) References Cited

U.S. PATENT DOCUMENTS

| | | | | |
|---|---|---|---|---|
| 6,892,953 | B2 * | 5/2005 | Matsuda | F25B 41/24<br>137/613 |
| 8,157,184 | B2 * | 4/2012 | Hayashi | F25B 41/38<br>236/92 B |
| 2018/0238455 | A1 * | 8/2018 | Yazawa | F16K 31/508 |
| 2019/0368792 | A1 * | 12/2019 | Tang | F16K 1/50 |
| 2021/0071921 | A1 * | 3/2021 | Wang | F16K 39/022 |

* cited by examiner

UP
LEFT
RIGHT
DOWN
1
10
11
12
12
13
14
13
15
20
22
21
16
23a
24
25
23
30
23b
31
33
30a
61
32
40
32b
44
32a
50
47
42
62
64
55
65
60
63
41
66

100
101
102
103
104(1)
64
65
105
106
107
108
109
110
111
112
113
114
115
116a
116b
116c
116d
116e
116f
COOLING MODE 100
101
102
103
104(1)
105
106
107
108
109
110
111
112
113
114
115
116a
116b
116c
116d
116e
116f
64
65
HEATING MODE

ELECTRIC EXPANSION VALVE AND REFRIGERATION CYCLE DEVICE

CROSS REFERENCE TO RELATED APPLICATIONS

The present application is a continuation application of International Patent Application No. PCT/JP2023/033395 filed on Sep. 13, 2023, which designated the U.S. and claims the benefit of priority from Japanese Patent Application No. 2022-165362 filed on Oct. 14, 2022. The disclosures of all the above applications are incorporated herein.

TECHNICAL FIELD

The present disclosure relates to an electric expansion valve and a refrigeration cycle device using the electric expansion valve.

BACKGROUND

Conventionally, an electric expansion valve is used in a refrigeration cycle.

SUMMARY

An electric expansion valve according to an aspect of the present disclosure includes a drive unit, an output shaft, a main body, a valve body and a joint portion. The drive unit is configured to generate drive force upon receiving supply of electric power. The output shaft is configured to rotate about an axis by drive force output from the drive unit and translate in conjunction with rotation of the output shaft. The main body includes a first inflow/outflow port, a second inflow/outflow port and a valve seat. The first inflow/outflow port is a port through which a refrigerant of a refrigeration cycle flows. The second inflow/outflow port is formed at a position different from the first inflow/outflow port. The valve chamber is disposed in a refrigerant passage connecting the first inflow/outflow port and the second inflow/outflow port. The valve seat is disposed inside the valve chamber. The valve body is disposed within the valve chamber to open and close an opening of the valve seat. The joint portion is configured to connect an end of the output shaft and the valve body to be integrally displaceable.

BRIEF DESCRIPTION OF DRAWINGS

The above-mentioned objectives and other objectives, features, and advantages of the present disclosure will become more apparent from the following detailed description with reference to the accompanying drawings.

DETAILED DESCRIPTION

Figure 1:
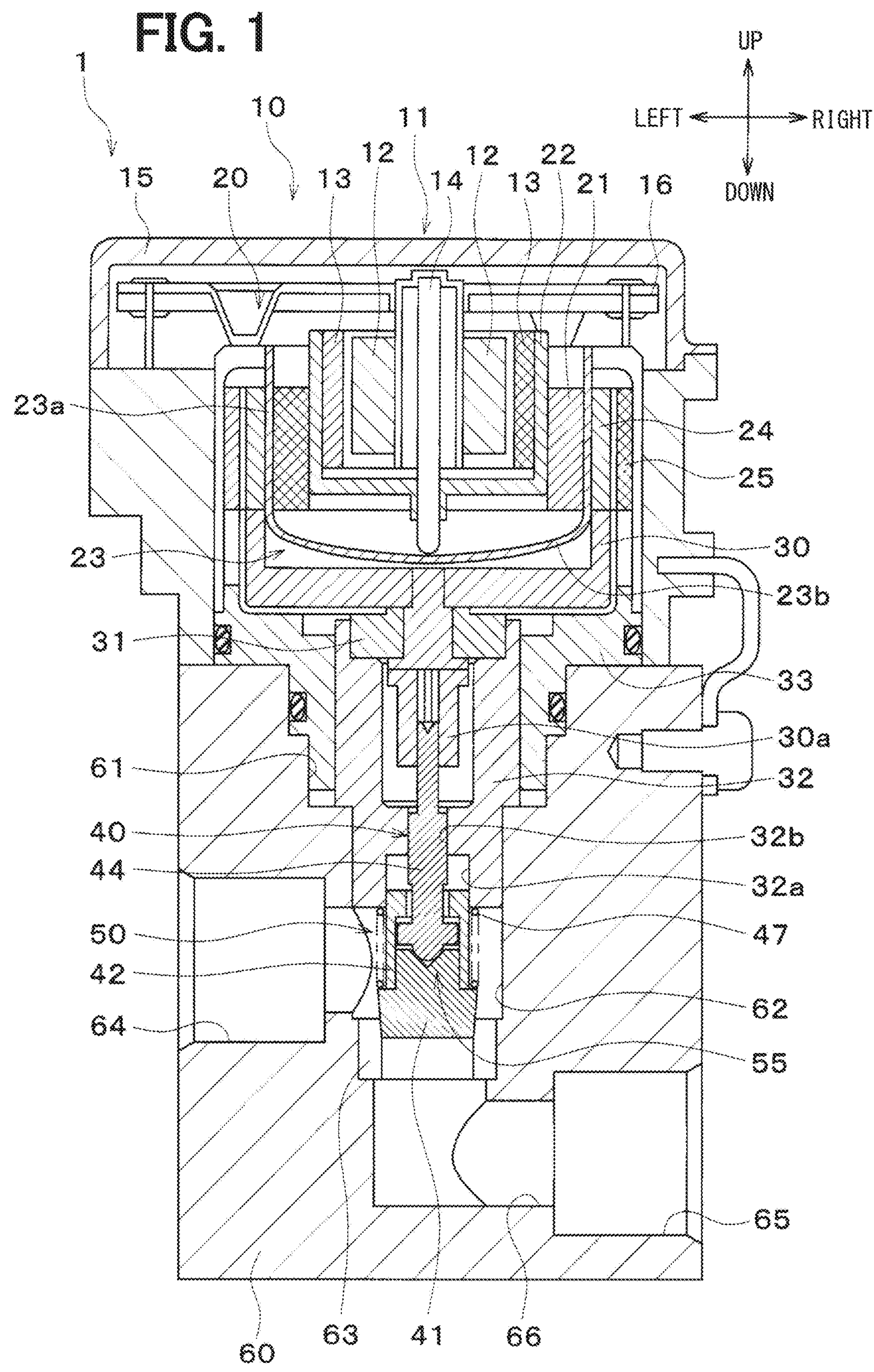
FIG. 1 is a schematic configuration diagram of an electric expansion valve according to a first embodiment.

According to a comparative example, an electric expansion valve is used in a refrigeration cycle. In the electric expansion valve, it is configured that rotational drive force generated by a motor is transmitted to a screw shaft via an output shaft formed in an output gear of a planetary gear reduction device.

The screw shaft is configured as a male screw of a screw mechanism, and cooperates with a female screw formed in a bearing, thereby converting the rotational drive force transmitted from the output shaft into power moving in the axial direction. Since a valve rod and a valve body are arranged at the end of the screw shaft via a ball, the valve rod and the valve body are configured to approach and separate from a valve seat depending on the displacement of the screw rod in the axial direction.

In the case of the electric expansion valve of the comparative example, it is configured that the refrigerant flows from the inflow port located below the valve seat to the outflow port disposed above the valve seat. Since the configuration of the refrigeration cycle using the electric expansion valve is complicated, it is desired to diversify the flow of the refrigerant between a first inflow/outflow port corresponding to the inflow port located below the valve seat and a second inflow/outflow port corresponding to the outflow port disposed above the valve seat. For example, it is desired to allow both a case where the refrigerant flows from the first inflow/outflow port to the second inflow/outflow port and a case where the refrigerant flows from the second inflow/outflow port to the first inflow/outflow port while the performance of the expansion valve is maintained.

When the electric expansion valve of the comparative example is closed, the ball is pushed down by displacement of the output shaft, and the valve rod and the valve body abut on the valve seat accordingly, and the electric expansion valve is closed. That is, when the electric expansion valve is closed, the drive force generated by the motor is transmitted to the valve rod and the valve body via the screw rod and the ball, so that the displacement amount of the valve body or the like corresponding to the drive control of the motor can be obtained.

However, when the electric expansion valve of the comparative example is opened, the screw rod is displaced in a direction away from the valve seat by the drive force generated by the motor. Regarding the ball, the valve body, and the like, the screw rod is displaced by the corresponding amount by the biasing force of a coil spring disposed in the valve body. The drive force of the motor directly acts on the screw rod, but indirectly acts on the ball, the valve body, and the like. Therefore, since the valve body is displaced by the biasing force of the coil spring when the electric expansion valve is opened, it is conceivable that the accuracy related to the control of displacement amount of the valve body or the like is lower than that of the drive control of the motor.

Consideration will be given to a case where the electric expansion valve of the comparative example is disposed to be directed from the outflow port side located above the valve seat to the inflow port side located below the valve seat. As described above, when the electric expansion valve is opened, the drive force of the motor is not transmitted to the valve body, and the biasing force of the coil spring acts in a valve opening direction. Therefore, in a case where the electric expansion valve is disposed under the above conditions, the valve body cannot be displaced in a direction away from the valve seat against the differential pressure of the refrigerant, and the electric expansion valve cannot be opened.

In contrast, according to the present disclosure, an electric expansion valve is capable of handling a plurality of modes related to a refrigerant flow between a first inflow/outflow port and a second inflow/outflow port formed in a main body. Further, a refrigeration cycle device can be made compact by causing the electric expansion valve to handle a plurality of modes related to the refrigerant flow between the first inflow/outflow port and the second inflow/outflow port.

An electric expansion valve according to an aspect of the present disclosure includes a drive unit, an output shaft, a main body, a valve body and a joint portion. The drive unit is configured to generate drive force upon receiving supply of electric power. The output shaft is configured to rotate about an axis by drive force output from the drive unit and translate in conjunction with rotation of the output shaft. The main body includes a first inflow/outflow port, a second inflow/outflow port and a valve seat. The first inflow/outflow port is a port through which a refrigerant of a refrigeration cycle flows. The second inflow/outflow port is formed at a position different from the first inflow/outflow port. The valve chamber is disposed in a refrigerant passage connecting the first inflow/outflow port and the second inflow/outflow port. The valve seat is disposed inside the valve chamber. The valve body is disposed within the valve chamber to open and close an opening of the valve seat. The joint portion is configured to connect an end of the output shaft and the valve body to be integrally displaceable.

According to the electric expansion valve, the end of the output shaft and the valve body are connected to be integrally displaceable by the joint portion, and thus the drive force output from the drive unit can be transmitted to the output shaft, the joint portion, and the valve body, and the end of the output shaft and the valve body can be integrally displaced. As a result, the electric expansion valve can adjust the decompression amount and the flow rate of the refrigerant in response to both the case where the refrigerant flows from the first inflow/outflow port to second inflow/outflow port and the case where the refrigerant flows from the second inflow/outflow port to the first inflow/outflow port.

A refrigeration cycle device according to an aspect of the present disclosure includes a refrigeration cycle that includes a compressor, a radiator, an electric expansion valve and an evaporator. The compressor is configured to compress and discharge a refrigerant. The radiator is configured to radiate heat of the high-pressure refrigerant discharged from the compressor. The electric expansion valve is configured to decompress the refrigerant flowing out of the radiator. The evaporator is configured to evaporate the refrigerant decompressed by the electric expansion valve.

The electric expansion valve includes a drive unit, an output shaft, a main body, a valve body and a joint portion. The drive unit is configured to generate drive force upon receiving supply of electric power. The output shaft is configured to rotate about an axis by drive force output from the drive unit and translate in conjunction with rotation of the output shaft. The main body includes a first inflow/outflow port, a second inflow/outflow port and a valve seat. The first inflow/outflow port is a port through which a refrigerant of a refrigeration cycle flows. The second inflow/outflow port is formed at a position different from the first inflow/outflow port. The valve chamber is disposed in a refrigerant passage connecting the first inflow/outflow port and the second inflow/outflow port. The valve seat is disposed inside the valve chamber. The valve body is disposed within the valve chamber to open and close an opening of the valve seat. The joint portion is configured to connect an end of the output shaft and the valve body to be integrally displaceable.

Furthermore, the refrigeration cycle device is switchable between a first operation mode and a second operation mode. The first operation mode is an operation mode in which the refrigerant of the refrigeration cycle flows from the first inflow/outflow port to the second inflow/outflow port via the refrigerant passage and the valve chamber. The second operation mode is an operation mode in which the refrigerant of the refrigeration cycle flows from the second inflow/outflow port to the first inflow/outflow port via the refrigerant passage and the valve chamber.

According to the refrigeration cycle device, the end of the output shaft and the valve body are connected to be integrally displaceable by the joint portion of the electric expansion valve, and thus in the electric expansion valve, the drive force output from the drive unit can be transmitted to the output shaft, the joint portion, and the valve body, and the end of the output shaft and the valve body can be integrally displaced. As a result, the refrigeration cycle device can reliably perform the first operation mode and the second operation mode.

In a case where the flow of the refrigerant in the electric expansion valve is limited to the flow from the first inflow/outflow port to the second inflow/outflow port in the refrigeration cycle device, the configuration of guiding the refrigerant flowing out of a component on the second inflow/outflow port side to a component on the first inflow/outflow port side via the electric expansion valve is complicated. That is, under this condition, the refrigeration cycle device needs to have a configuration of guiding the refrigerant flowing out of the component on the second inflow/outflow port side to the first inflow/outflow port of the electric expansion valve and a configuration of guiding the refrigerant flowing out of the second inflow/outflow port of the electric expansion valve to the component on the first inflow/outflow port side.

In this regard, according to the refrigeration cycle device of one aspect of the present disclosure, the electric expansion valve is configured to be able to handle the first operation mode and the second operation mode, and thus it is possible to obtain a compact configuration as compared with the refrigeration cycle device configured under the conditions described above.

Hereinafter, multiple embodiments will be described with reference to the drawings. Elements corresponding to each other among the embodiments are assigned the same numeral and their descriptions may be omitted. When only a part of a component is described in an embodiment, the other part of the component can be relied on the component of a preceding embodiment. Furthermore, in addition to the combination of components explicitly described in each embodiment, it is also possible to combine components from different embodiments, as long as the combination poses no difficulty, even if not explicitly described.

First Embodiment

A first embodiment of the present disclosure will be described with reference to the drawings. An electric expansion valve according to the present disclosure is applied to a refrigerant circuit constituting a refrigeration cycle of a vehicle air conditioner. An electric expansion valve 1 includes a drive unit 10, a non-contact coupling portion 20, a valve body portion 40, and a main body 60, and transmits drive force generated by electric power in a drive motor 11 as a drive source to move a valve body 41, thereby adjusting the flow rate of a refrigerant and decompressing the refrigerant.

The electric expansion valve 1 is vertically disposed in a vehicle. The vertical arrangement is an arrangement in which the axial direction of the valve body portion 40 is substantially parallel to a vehicle vertical direction and the drive unit 10 is on the vehicle upper side with respect to a driven-side mechanism.

First, a configuration of the electric expansion valve 1 according to the first embodiment will be described with reference to the drawings. As illustrated in FIG. 1, the electric expansion valve 1 according to the first embodiment includes the drive unit 10 including a drive motor 11 as a drive source. The drive unit 10 includes the drive motor 11 and a motor case 15. The drive motor 11 is a motor that can be driven by speed feedback control, and includes a stator 12, a rotor 13, and a shaft 14. The drive motor 11 is, for example, a three-phase brushless motor, a DC brush motor, or the like.

The shaft 14 is an output shaft of the drive motor 11, and rotates integrally with the rotor 13. The motor case 15 is made of thermoplastic resin (for example, polyphenylene sulfide), and is attached to the main body 60 so as to cover the drive motor 11 and the like. The motor case 15 houses the drive motor 11 in the internal space formed by the upper surface of the main body 60. The stator 12 is fixed to the motor case 15. Although not illustrated, the stator 12 includes a stator coil. In the first embodiment, the number Ns of slots of the stator 12 is six.

The rotor 13 is formed in a cylindrical shape, and the stator 12 is disposed inside the rotor 13. In the rotor 13, a plurality of pairs of magnets including N poles and S poles are arranged along the circumferential direction. In the first embodiment, since each of the numbers of the N poles and the S poles is four, the number Pr of poles of the rotor 13 is eight. The stator 12 and the rotor 13 output drive force for rotating the shaft 14 by electromagnetic force.

A drive circuit unit 16 is housed in the motor case 15. The drive circuit unit 16 includes a circuit board on which a plurality of electronic components for controlling the drive motor 11 are mounted. Although not illustrated, the motor case 15 includes an axial alignment portion for axially aligning (so-called centering) the shaft 14 of the drive unit 10 and a rotating member 30 to be described later. The axial alignment portion is fitted to the main body 60.

As illustrated in FIG. 1, the electric expansion valve 1 according to the first embodiment includes the non-contact coupling portion 20. The non-contact coupling portion 20 includes a magnetic gear and a partition wall 23. The magnetic gear includes a drive-side magnet 21, a pole piece 24, and a fixed magnet 25.

The drive-side magnet 21 is an input-shaft side magnet that rotates integrally with the shaft 14 of the drive motor 11. The pole piece 24 is a magnetic modulator that modulates magnetic flux between the drive-side magnet 21 and the fixed magnet 25, and rotates integrally with the rotating member 30. The fixed magnet 25 is fixed to the main body 60 side of the electric expansion valve 1.

The drive-side magnet 21 has a cylindrical shape, and is joined to the outer peripheral surface of the rotor 13 of the drive motor 11 via a cylindrical interposing member 22. That is, the drive motor 11 is disposed inside the drive-side magnet 21. The interposing member 22 is made of a magnetic material.

In the drive-side magnet 21, at least one pair of magnets including an N pole and an S pole is disposed along the circumferential direction. In the first embodiment, since one N pole and one S pole are provided, the number Pin of poles of the drive-side magnet 21 is two.

The number Pin of poles of the drive-side magnet 21 is equal to a value obtained by subtracting the number Ns slots of the stator 12 from the number Pr of poles of the rotor 13. In the first embodiment, since the number Pr of poles of the rotor 13 is eight and the number Ns of slots of the stator 12 is six, the number Pin of poles of the drive-side magnet 21 is two.

The partition wall 23 is a sealing member that partitions the internal space of the electric expansion valve 1 into a drive-side space located on the drive unit 10 side and a driven-side space located on the main body 60 side, and seals the driven-side space. The partition wall 23 prevents the refrigerant (high-pressure refrigerant) present on the main body 60 side from leaking into the drive-side space. In the first embodiment, the partition wall 23 is a member having a predetermined magnetic permeability. For example, the partition wall 23 is made of stainless steel to which magnetism is applied by modifying austenitic stainless steel such as SUS305 into martensite by work hardening.

The partition wall 23 is joined to the main body 60. The partition wall 23 and the main body 60 constitute a pressure vessel with pressure resistance. The partition wall 23 has a disk shape having a central portion recessed downward, and has a sealing cylindrical portion **23*a* and a sealing bottom surface 23*b*. The sealing cylindrical portion 23*a* has a cylindrical shape and is located on the outer diameter side of the drive-side magnet 21. The sealing bottom surface 23*b* is located below the drive-side magnet 21, and closes the sealing cylindrical portion 23*a* from the main body 60** side.

The sealing bottom surface **23*b* is formed in a disk shape having a central portion curved downward. In the partition wall 23, the sealing cylindrical portion 23*a* and the sealing bottom surface 23*b* are integrally molded in order to improve pressure resistance. The corner portion forming the boundary between the sealing cylindrical portion 23*a* and the sealing bottom surface 23*b* is not a right angle, but is rounded with a predetermined curvature radius, so that the pressure resistance of the partition wall 23 is enhanced. As illustrated in FIG. 1, the sealing bottom surface 23*b* is disposed in a gap between the shaft 14 and the rotating member 30 in the axial direction of the shaft 14 and the rotating member 30**.

The pole piece 24 is formed in a cylindrical shape and is joined to the rotating member 30. The pole piece 24 includes a plurality of magnetic material portions and a plurality of non-magnetic material portions. In the pole piece 24, fan-shaped magnetic material portions are arranged at substantially equal intervals along the circumferential direction, and fan-shaped non-magnetic material portions are arranged between the magnetic material portions. Therefore, the pole piece 24 has a cylindrical shape in which the magnetic material portion and the non-magnetic material portion are alternately arranged, and is located on the outer diameter side of the sealing cylindrical portion 23*a* as illustrated in FIG. 1.

A soft magnetic material (for example, iron-based metal) can be used as the magnetic material portion constituting the pole piece 24, and a non-magnetic material (for example, stainless steel or resin) can be used as the non-magnetic material portion.

The fixed magnet 25 is formed in a cylindrical shape, and is disposed on the outer diameter side of the pole piece 24 as illustrated in FIG. 1. The fixed magnet 25 is fitted into a housing cylindrical portion formed in a cylindrical shape in the main body 60 via a cylindrical back yoke (not illustrated). The back yoke and the housing cylindrical portion are made of a magnetic material.

In the fixed magnet 25, a plurality of pairs of magnets including N poles and S poles are arranged at substantially equal intervals along the circumferential direction. The number Pf of poles of the fixed magnet 25 is larger than the number Pin of poles of the drive-side magnet 21. In the first embodiment, since each of the numbers of the N poles and the S poles constituting the fixed magnet 25 is 20, the number Pf of poles of the fixed magnet 25 is 40. The fixed magnet 25 is a multipolar magnet having a larger number of poles than the drive-side magnet 21.

In the first embodiment, the number Pp of poles of the pole piece 24 is the same as the sum of the number Pin of poles of the drive-side magnet 21 and the number Pf of poles of the fixed magnet 25. As described above, since the number Pin of poles of the drive-side magnet 21 is two and the number Pf of poles of the fixed magnet 25 is 40, the number Pp of poles of the pole piece 24 is 42. That is, each of the numbers of the magnetic material portions and the non-magnetic material portions in the pole piece 24 is 21. In other words, the number Npp of the magnetic material portions in the pole piece 24 is equal to a value obtained by dividing the sum of the number Pin of poles of the drive-side magnet 21 and the number Pf of poles of the fixed magnet 25 by two.

The axial length of the pole piece 24 is shorter than the axial length of the fixed magnet 25. As a result, the magnetic flux leakage in the axial direction in the pole piece 24 can be reduced, and the transmission torque can be improved.

As illustrated in FIG. 1, the electric expansion valve 1 includes the rotating member 30 disposed so as to cover the lower side and the side of the partition wall 23. The rotating member 30 is an output member for outputting drive force to the valve body portion 40. The rotating member 30 is rotated by the drive force transmitted from the drive motor 11 of the drive unit 10 via the non-contact coupling portion 20.

An output portion 30*a* is formed on the lower surface of the rotating member 30. The output portion 30*a* is formed in a rod shape extending downward from the rotation center of the rotating member 30, and is disposed coaxially with the shaft 14 of the drive motor 11. The output portion 30*a* is rotatably supported by a bearing member 31 fixed to an attachment portion 61 formed on the upper surface of the main body 60. Therefore, the rotating member 30 is rotatably supported below the partition wall 23 and above the attachment portion 61 of the main body 60.

An upper end of an output shaft 44 constituting the upper portion of the valve body portion 40 is connected to a lower end of the output portion 30*a*. Therefore, the drive force output from the output portion 30*a* of the rotating member 30 is transmitted to the output shaft 44 of the valve body portion 40.

As illustrated in FIG. 1, a shaft case 32 is attached on the upper surface of the main body 60. The shaft case 32 is attached to the attachment portion 61 formed in the upper portion of the main body 60 via a holding member 33, and has a communication hole 32*a* through which the valve body portion 40 is inserted.

The holding member 33 is made of stainless steel, and is attached to the attachment portion 61 formed in the main body 60 while holding the shaft case 32 therein. The attachment portion 61 is opened to communicate with a valve chamber 62 on the upper surface of the main body 60. Therefore, the holding member 33 holds the shaft case 32 in a manner that the communication hole 32*a* is coaxial with the shaft 14 of the drive motor 11 and the output portion 30*a* of the rotating member 30. As a result, the moving direction of the valve body portion 40 is determined by the communication hole 32*a* so as to move coaxially with the shaft 14 and the output portion 30*a*.

As illustrated in FIG. 1, the electric expansion valve 1 according to the first embodiment includes the valve body portion 40 that is displaced by the drive force transmitted by the output portion 30*a* of the rotating member 30 via the drive unit 10 and the non-contact coupling portion 20. The valve body portion 40 is formed in a rod shape integrally including the valve body 41, a cap member 42, and the output shaft 44.

The output shaft 44 is a shaft member disposed inside the communication hole 32*a* formed in the shaft case 32, and includes an abutting projection 44*a*, a locking portion 45, and a male screw portion 46. As described above, the end of the output shaft 44 on the drive unit 10 side is joined to the output portion 30*a* of the rotating member 30. Therefore, the drive force generated in the drive unit 10 is transmitted to the output shaft 44 via the non-contact coupling portion 20 and the output portion 30*a* of the rotating member 30. As a result, the output shaft 44 rotates about the axial center inside the communication hole 32*a* of the shaft case 32.

The male screw portion 46 is configured by forming a male screw on the outer peripheral surface of the output shaft 44, and is screwed into a female screw portion 32*b* formed in a part of the communication hole 32*a* of the shaft case 32. That is, in the electric expansion valve 1, the male screw portion 46 of the output shaft 44 and the female screw portion 32*b* in the communication hole 32*a* constitute a screw mechanism.

The rotational operation of the output shaft 44 transmitted via the output portion 30*a* is converted into an advancing and retracting operation of advancing and retracting along the axial direction inside the communication hole 32*a* by the screw mechanism. That is, the output shaft 44 is rotated around the axis by the drive force output from the drive unit and is translationally displaced with the rotation by the male screw portion 46 of the output shaft 44 and the female screw portion 32*b* in the communication hole 32*a*.

Figure 2:
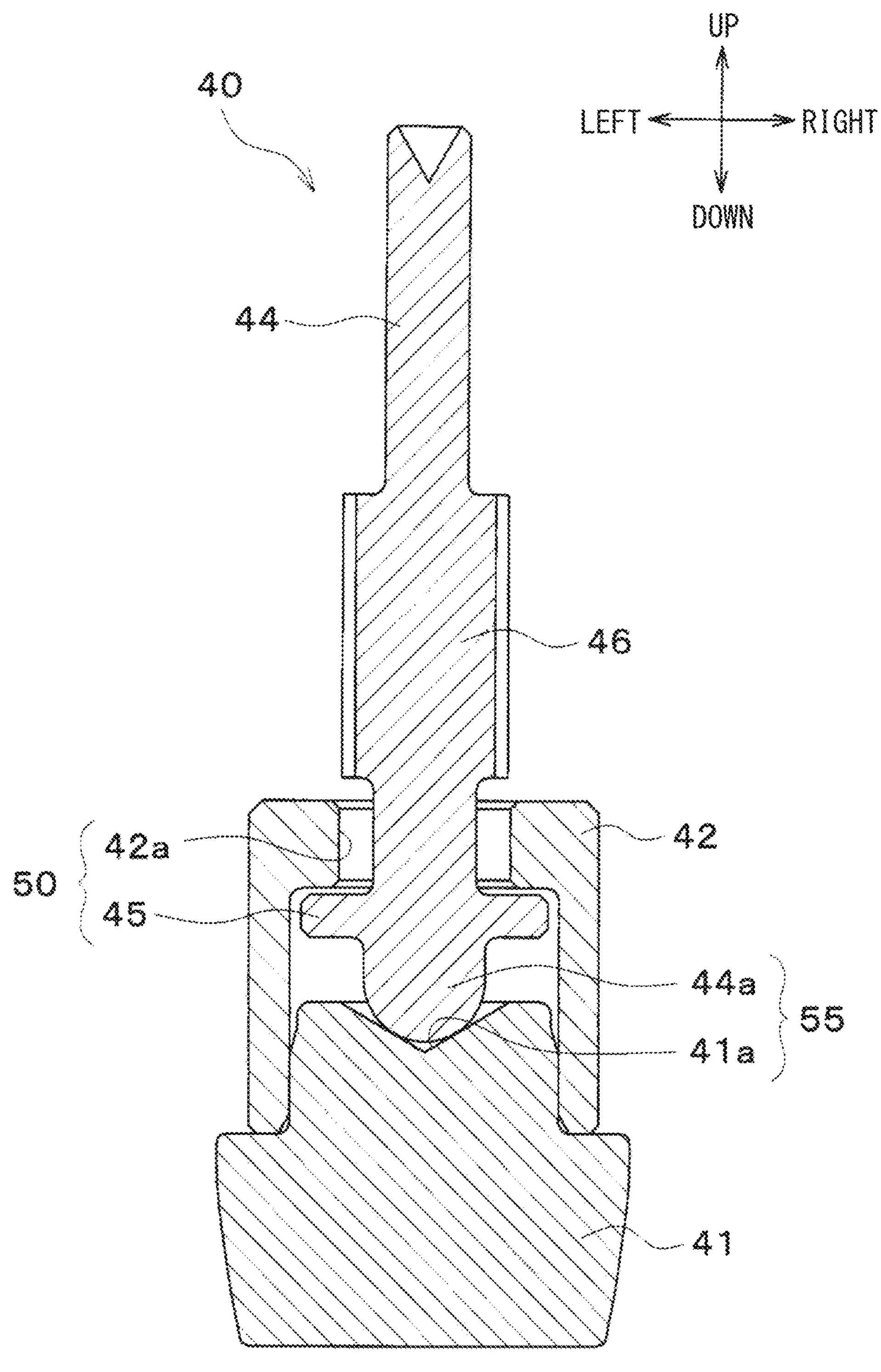
FIG. 2 is an enlarged cross-sectional view illustrating a configuration of a joint portion and a centering mechanism in the electric expansion valve according to the first embodiment.

As illustrated in FIGS. 1 and 2, the abutting projection 44*a* and the locking portion 45 are formed at the end of the output shaft 44 according to the first embodiment. The abutting projection 44*a* and the locking portion 45 cooperate the valve body 41 and the cap member 42 to constitute a joint portion 50 and a centering mechanism 55.

The joint portion 50 is configured to connect the end of the output shaft 44 and the valve body 41 to be integrally displaceable in a state where translational displacement with the rotation of the output shaft 44 and displacement of the valve body 41 in the valve chamber 62 are ensured. The centering mechanism 55 is configured to perform adjustment in a manner that the axial center of the output shaft 44 matches the axial center of the valve body 41 in a state where the output shaft 44, the valve body 41, and the cap member 42 are connected by the joint portion 50. Specific configurations of the joint portion 50 and the centering mechanism 55 will be described later in detail.

As described above, the valve body 41 is attached to the end of the output shaft 44 by the joint portion 50, and is disposed inside the valve chamber 62 formed in the main body 60. The valve body 41 is disposed so as to approach and separate from a valve seat 63 inside the valve chamber 62 depending on the displacement of the output shaft 44 in the communication hole 32*a* of the shaft case 32, and is configured to be able to open and close the opening of the valve seat 63.

The cap member 42 is a cylindrical member integrally attached to the upper surface side (that is, output shaft 44 side) of the valve body 41. An insertion hole 42*a* is formed on the upper surface side of the cap member 42, and the end of the output shaft 44 is inserted into the insertion hole 42*a*. A predetermined internal space is formed between the upper surface of the cap member 42 and the upper surface of the valve body 41, and the abutting projection 44*a* and the locking portion 45 formed at the end of the output shaft 44 are housed in the internal space.

A coil spring 47 is disposed between the lower end of the shaft case 32 constituting the upper surface of the valve chamber 62 and the valve body 41. The coil spring 47 is attached in a state of being inserted through the output shaft 44, the cap member 42, and the valve body 41. The coil spring 47 biases the valve body portion 40 in a direction in which the valve body 41 approaches the valve seat 63.

As a result, the backlash in the output shaft 44 of the valve body portion 40 and the female screw portion 32*b* of the shaft case 32 can be canceled by the biasing force of the coil spring 47, and the flow rate characteristic of the refrigerant in the electric expansion valve 1 can be made uniform.

As illustrated in FIG. 1, the electric expansion valve 1 according to the first embodiment includes the main body 60 having the valve chamber 62 and the like. The main body 60 constitutes a part of the housing of the electric expansion valve 1. The main body 60 is made of a cast material (for example, AC4C) using an Al—Si—Mg-based aluminum alloy, and includes the valve chamber 62, the valve seat 63, a first inflow/outflow port 64, a second inflow/outflow port 65, and the like.

In the main body 60, the valve chamber 62 is a portion through which the refrigerant of the refrigeration cycle flows, and at the same time, forms a space in which the valve body 41 of the valve body portion 40 moves. On the upper surface of the main body 60, the attachment portion 61 that communicates with the upper portion of the valve chamber 62 and to which the shaft case 32 and the holding member 33 are attached is formed.

As illustrated in FIGS. 1 and 2, the valve seat 63 is formed inside the valve chamber 62. As described above, since the shaft case 32 and the holding member 33 are attached to the attachment portion 61 located above the valve chamber 62, the valve chamber 62 communicates with the drive motor 11 of the drive unit 10, the non-contact coupling portion 20, and the rotating member 30 via the communication hole 32*a*.

The valve chamber 62 is also connected to the first inflow/outflow port 64 and the second inflow/outflow port 65 as parts of a refrigerant passage 66 formed inside the main body 60. The first inflow/outflow port 64 is connected to an inflow/outflow port of one (for example, outside heat exchanger 103) of components in the refrigeration cycle via a refrigerant pipe. In the main body 60, the first inflow/outflow port 64 is connected to a position above the valve seat 63 in the valve chamber 62 via the refrigerant passage 66.

On the other hand, the second inflow/outflow port 65 is connected to inflow/outflow ports of other components (for example, third connecting portion 116*c* and evaporator 107) in the refrigeration cycle via refrigerant pipes. In the main body 60, the second inflow/outflow port 65 is connected to a position below the valve seat 63 in the valve chamber 62 via the refrigerant passage 66.

Therefore, in the electric expansion valve 1 according to the first embodiment, in a case where the refrigerant flows from the first inflow/outflow port 64 to the second inflow/outflow port 65, the refrigerant flows through the first inflow/outflow port 64, the refrigerant passage 66, the valve chamber 62 (valve seat 63), the refrigerant passage 66, and the second inflow/outflow port 65 in this order. On the other hand, in a case where the refrigerant flows from the second inflow/outflow port 65 to the first inflow/outflow port 64, the refrigerant flows through the second inflow/outflow port 65, the refrigerant passage 66, the valve chamber 62 (valve seat 63), the refrigerant passage 66, and the first inflow/outflow port 64 in this order. That is, the flow direction of the refrigerant is reversed in the path connecting the first inflow/outflow port 64 and the second inflow/outflow port 65 formed in the main body 60.

In the electric expansion valve 1 according to the first embodiment, the valve body 41 separates from the valve seat 63 in the valve chamber 62, so that the refrigerant flows between the first inflow/outflow port 64 and the second inflow/outflow port 65, and decompresses and expands.

Next, a specific configuration of the joint portion 50 in the electric expansion valve 1 according to the first embodiment will be described in detail with reference to the drawings. The joint portion 50 of the electric expansion valve 1 according to the first embodiment includes the cap member 42, and the abutting projection 44*a* and the locking portion 45 formed on the lower end side (that is, valve body 41 side) of the output shaft 44.

As described above, the cap member 42 is a cylindrical member integrally attached to the upper surface side (that is, output shaft 44 side) of the valve body 41. The upper surface of the valve body 41 and the lower end surface of the output shaft 44 are opposed surfaces facing each other. As illustrated in FIG. 2, the insertion hole 42*a* is formed on the upper surface side of the cap member 42, and the end of the output shaft 44 is inserted into the insertion hole 42*a*.

At the lowermost end of the output shaft 44, the abutting projection 44*a* with a hemispherical shape, curved in a manner that the axial center portion of the output shaft 44 is the lowest is formed. The abutting projection 44*a* is a portion that abuts on the upper surface of the valve body 41 when the output shaft 44 is displaced downward so as to approach the valve seat 63.

The locking portion 45 is formed at the lower end of the output shaft 44. The locking portion 45 is disposed on the abutting projection 44*a* of the output shaft 44, and is formed in a flange shape extending in a direction intersecting the axial center of the output shaft 44. The flange-shaped locking portion 45 is wider than the opening of the insertion hole 42*a* in the cap member 42, and has a portion at least wider than the maximum diameter of the insertion hole 42*a*.

As illustrated in FIG. 2, a predetermined internal space is formed between the upper surface of the cap member 42 and the upper surface of the valve body 41, and the abutting projection 44*a* and the locking portion 45 formed at the end of the output shaft 44 are housed in the internal space.

In a case where the drive force from the drive motor 11 is transmitted and the output shaft 44 moves upward so as to be separated from the valve seat 63, the locking portion 45 of the output shaft 44 abuts on the opening edge of the insertion hole 42*a* in the cap member 42 from below. As described above, since the cap member 42 is integrally attached to the valve body 41, the drive force of the drive motor 11 is transmitted to the valve body 41 by the contact between the locking portion 45 of the output shaft 44 and the cap member 42. As a result, in the electric expansion valve 1, the drive force of the drive motor 11 is transmitted to the valve body 41 via the joint portion 50, and the valve body 41 can be pulled upward so as to be separated from the valve seat 63.

In a case where the drive force from the drive motor 11 is transmitted and the output shaft 44 moves downward so as to approach the valve seat 63, the abutting projection 44*a* of the output shaft 44 abuts on the upper surface of the valve body 41 in the internal space between the upper surface of the cap member 42 and the upper surface of the valve body 41. As a result, in the electric expansion valve 1, the drive force of the drive motor 11 is transmitted to the valve body 41, and the valve body 41 can be pushed down with respect to the valve seat 63 located below the valve body.

That is, according to the electric expansion valve 1 of the first embodiment, the drive force generated by the drive unit 10 can be transmitted to the valve body 41 via the joint portion 50, and the displacement amount of the valve body 41 with respect to the valve seat 63 can be appropriately controlled.

Also in a case where the valve opening operation of the electric expansion valve 1 to separate the valve body 41 from the valve seat 63 is performed, the drive force of the drive motor 11 is transmitted to the valve body 41 and the valve body 41 can be displaced. Therefore, the valve opening operation of the electric expansion valve 1 can be performed while the influence of the differential pressure of the refrigerant and the like is suppressed. As a result, the electric expansion valve 1 according to the first embodiment can exhibit a function as an expansion valve in both the case where the refrigerant flows from the first inflow/outflow port 64 to the second inflow/outflow port 65 via the valve chamber 62 and the case where the refrigerant flows from the second inflow/outflow port 65 to the first inflow/outflow port 64 via the valve chamber 62.

Next, a specific configuration of the centering mechanism 55 in the electric expansion valve 1 according to the first embodiment will be described in detail with reference to the drawings. The centering mechanism 55 of the electric expansion valve 1 according to the first embodiment includes the abutting projection 44*a* formed on the distal end side (that is, valve body 41 side) of the output shaft 44 and a recess 41*a* formed on the upper surface of the valve body 41.

As described above, the abutting projection 44*a* of the output shaft 44 according to the first embodiment is formed in a hemispherical shape curved in a manner that the axial center portion of the output shaft 44 is the lowest at the lower end of the output shaft 44.

On the other hand, the recess 41*a* on which the abutting projection 44*a* of the output shaft 44 abuts is formed on the upper surface of the valve body 41 according to the first embodiment. The recess 41*a* is formed by recessing the upper surface of the valve body 41 downward, and a portion located on the axial center of the valve body 41 is deepest. The inner peripheral surface of the recess 41*a* is formed as a tapered surface inclined at a predetermined angle. Therefore, the internal shape of the recess 41*a* is a conical shape having a vertex on the axial center of the valve body 41, and the abutting projection 44*a* can be fitted into the recess.

In the centering mechanism 55 configured as described above, in a case where the output shaft 44 presses the valve body 41 (that is, in the case of a valve closing operation), the position of the output shaft 44 is adjusted in a manner that the axial center of the output shaft 44 matches the axial center of the valve body 41.

Specifically, in a case where the valve closing operation of the electric expansion valve 1 is performed, when the output shaft 44 moves downward toward the valve body 41 by the drive force of the drive motor 11, the abutting projection 44*a* abuts on the recess 41*a* formed on the upper surface of the valve body 41. A tapered surface is formed inside the recess 41*a*, and the recess is formed in a manner that the position on the axial center of the valve body 41 is deepest.

For this reason, when the output shaft 44 moves downward in a state where the abutting projection 44*a* abuts on the tapered surface of the recess 41*a*, the position of the output shaft 44 is adjusted in a manner that the lowest end of the hemispherical abutting projection 44*a* is located at the deepest position of the recess 41*a* recessed conically.

As described above, the lowermost end of the abutting projection 44*a* is disposed on the axial center of the output shaft 44, and the deepest position in the recess 41*a* is located on the axial center of the valve body 41. Therefore, the position of the output shaft 44 can be adjusted in a manner that the axial center of the output shaft 44 matches the axial center of the valve body 41 during the valve closing operation of the electric expansion valve 1 by the cooperation of the abutting projection 44*a* and the recess 41*a* constituting the centering mechanism 55.

Since the valve body 41 is pressed by the output shaft 44 in a state where the axial center of the valve body 41 and the axial center of the output shaft 44 match each other, the drive force transmitted to the output shaft 44 can be appropriately transmitted to the valve body 41, and the decompression function and the flow rate adjustment function of the electric expansion valve 1 can be reliably exhibited.

Next, an operation of the electric expansion valve 1 according to the first embodiment configured as described above will be described with reference to the drawings. In the electric expansion valve 1 according to the first embodiment, when the rotor 13 is rotated by electric power in the drive motor 11, the rotating member 30 rotates via the non-contact coupling portion 20. The drive force is then transmitted to the output shaft 44 of the valve body portion 40 via the output portion 30*a* of the rotating member 30.

When the output shaft 44 of the valve body portion 40 rotates, the rotational operation of the output shaft 44 is converted into the advancing and retracting operation in the axial direction of the valve body portion 40 by the cooperation of the male screw portion 46 of the output shaft 44 and the female screw portion 32*b* of the shaft case 32. As a result, by switching the rotation direction of the output shaft 44 by the drive control of the drive motor 11 or the like, the moving direction of the output shaft 44 in the axial direction can be changed.

For example, in a case where the rotor 13 is rotated in a predetermined direction, the output shaft 44 can be moved so as to approach the valve seat 63. In this case, by rotating the rotor 13 in a direction opposite to the predetermined direction, the output shaft 44 can be moved away from the valve seat 63.

In a case where the output shaft 44 is moved so as to approach the valve seat 63, the abutting projection 44*a* of the output shaft 44 abuts on the recess 41*a* of the valve body 41 and presses the valve body 41 so as to approach the valve seat 63. At this time, the hemispherical abutting projection 44*a* and the conically recessed recess 41*a* cooperate, so that the position of the output shaft 44 is adjusted in a manner that the axial center of the output shaft 44 matches the axial center of the valve body 41.

As described above, according to the electric expansion valve 1, in a case where the output shaft 44 is moved to approach the valve seat 63, the drive force derived from the drive motor 11 can be appropriately applied to the valve body 41 via the output shaft 44 to perform the valve closing operation.

On the other hand, in a case where the output shaft 44 is moved away from the valve seat 63, the positional relationship between the end of the output shaft 44 and the valve body 41 is held by the joint portion 50. As illustrated in FIG. 2, the lower end of the output shaft 44 is inserted through the insertion hole 42*a* of the cap member 42 integrally attached to the valve body 41, and the locking portion 45 constituting the joint portion 50 is disposed in the internal space between the upper surface of the cap member 42 and the upper surface of the valve body 41.

Since the locking portion 45 is formed in a flange shape extending larger than the maximum diameter of the insertion hole 42*a*, in a case where the output shaft 44 is moved away from the valve seat 63, the locking portion 45 can abut on the opening edge of the insertion hole 42*a* in the cap member 42. Since the cap member 42 is integrally attached to the valve body 41, the drive force transmitted to the output shaft 44 acts on the valve body 41 via the joint portion 50, and can move the valve body 41 away from the valve seat 63.

As described above, according to the electric expansion valve 1, in a case where the output shaft 44 is moved away from the valve seat 63, the drive force derived from the drive motor 11 can be appropriately applied to the valve body 41 via the joint portion 50 to perform the valve opening operation.

According to the electric expansion valve 1, the drive force generated by the drive motor 11 can be transmitted to the valve body 41 and can move the valve body in both the valve closing operation of moving the valve body 41 so as to approach the valve seat 63 and the valve opening operation of displacing the valve body 41 away from the valve seat 63. As a result, the electric expansion valve 1 can perform the displacement of the valve body 41 based on the control of the drive motor 11 in both the case where the refrigerant flows from the first inflow/outflow port 64 to the second inflow/outflow port 65 and the case where the refrigerant flows from the second inflow/outflow port 65 to the first inflow/outflow port 64, and can be applied to both modes.

As described above, the electric expansion valve 1 is configured to handle both the case where the refrigerant flows from the first inflow/outflow port 64 to the second inflow/outflow port 65 and the case where the refrigerant flows from the second inflow/outflow port 65 to the first inflow/outflow port 64.

As one application example of the electric expansion valve 1 described above, a refrigeration cycle device 100 constituting a part of a vehicle air conditioner will be described with reference to FIGS. 3 to 5. The refrigeration cycle device 100 adjusts the temperature of blown air to be blown into a vehicle compartment for air conditioning in the vehicle compartment. The refrigeration cycle device 100 is configured to be able to switch a refrigerant circuit depending on each operation mode to be described later for air conditioning in the vehicle compartment.

The refrigeration cycle device 100 uses an HFO refrigerant (specifically, R1234yf) as the refrigerant. The refrigeration cycle device 100 configures a subcritical refrigeration cycle in which the pressure of a high-pressure refrigerant discharged from a compressor 101 does not exceed the critical pressure of the refrigerant. Refrigerant oil for lubricating the compressor 101 is mixed in the refrigerant. The refrigerant oil is a PAG oil with compatibility with a liquid-phase refrigerant. A part of the refrigerant oil circulates in the cycle together with the refrigerant.

Figure 3:
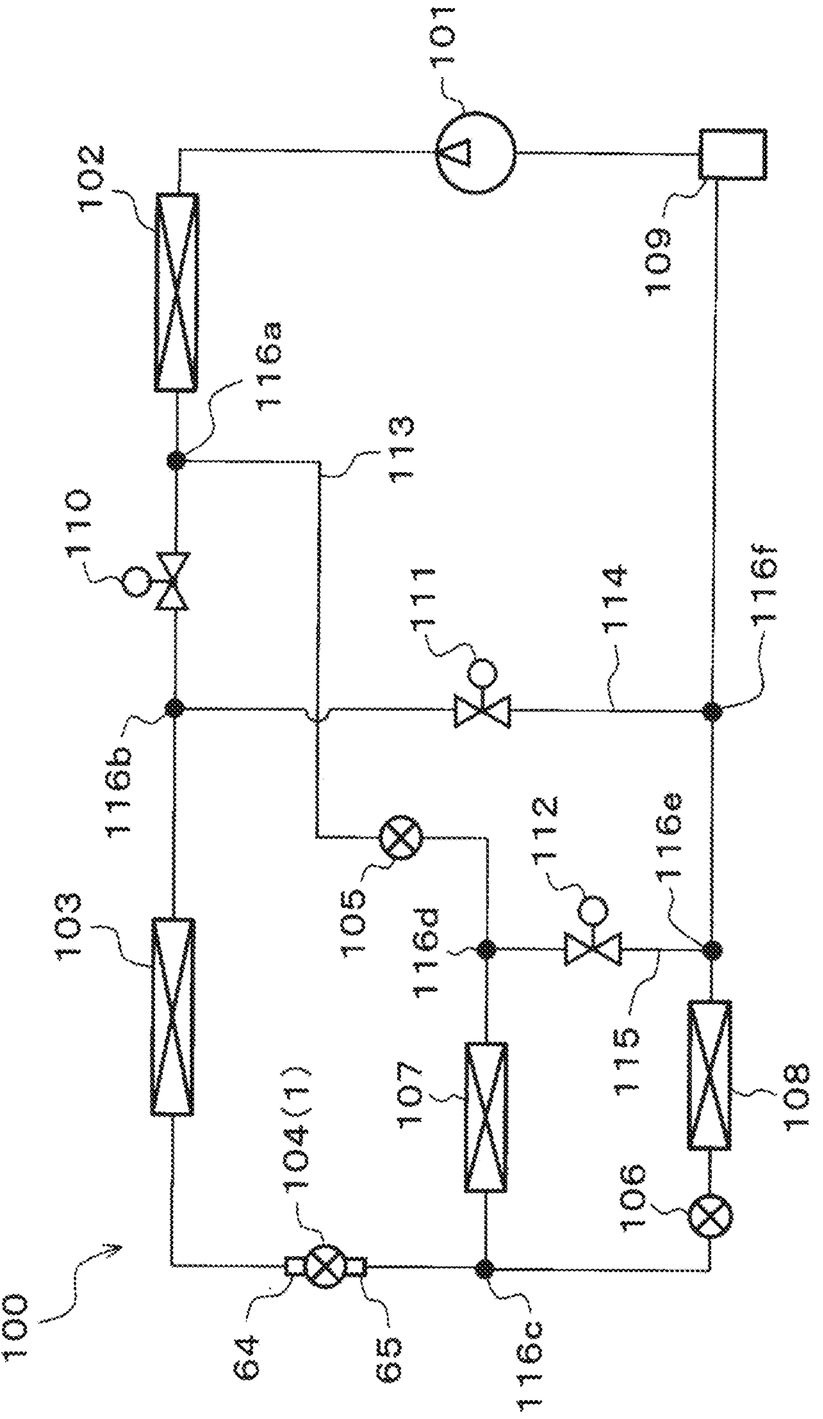
FIG. 3 is a schematic configuration diagram of a refrigeration cycle device according to the first embodiment.

As illustrated in FIG. 3, the refrigeration cycle device 100 includes the compressor 101, an inside condenser 102, the outside heat exchanger 103, a first expansion valve 104, a second expansion valve 105, a third expansion valve 106, the evaporator 107, a chiller 108, an accumulator 109, and the like. The compressor 101 sucks, compresses, and discharges the refrigerant in the refrigeration cycle device 100. The rotation speed (that is, refrigerant discharge capacity) of the compressor 101 is controlled by a control signal output from a control device (not illustrated).

A refrigerant inlet side of the inside condenser 102 is connected to a discharge port of the compressor 101. The inside condenser 102 is a condenser that exchanges heat between a high-pressure refrigerant discharged from the compressor 101 and blown air blown into the vehicle compartment. The inside condenser 102 is provided in an inside air conditioning unit 120 disposed inside an instrument panel (instrument panel) at the foremost part of the vehicle compartment.

The inside air conditioning unit 120 configures an air passage for supplying the blown air blown by an inside blower 122 into the vehicle compartment. In the inside condenser 102, heat of the discharge refrigerant is radiated to the blown air to heat the blown air. Therefore, the inside condenser 102 is an example of a radiator that radiates heat of the refrigerant discharged from the compressor 101.

An inflow port side of a first connecting portion 116*a* is connected to a refrigerant outlet of the inside condenser 102. The first connecting portion 116*a* is a three-way joint having three inflow/outflow ports communicating with each other. The refrigeration cycle device 100 further includes second connecting portion 116*b* to sixth connecting portion 116*f* as described later. The basic configuration of the second connecting portion 116*b* to the sixth connecting portion 116*f* is similar to that of the first connecting portion 116*a*.

One inflow port of the second connecting portion 116*b* is connected to one outflow port of the first connecting portion 116*a* via a first electromagnetic valve 110. On the other hand, a first bypass flow path 113 is connected to the other outflow port of the first connecting portion 116*a*. The first electromagnetic valve 110 is an electromagnetic valve that opens and closes a refrigerant passage connecting one outflow port of the first connecting portion 116*a* and one inflow port of the second connecting portion 116*b*. Operation of the first electromagnetic valve 110 is controlled by a control voltage output from the control device described above.

As described above, one inflow/outflow port of the second connecting portion 116*b* is connected to the outflow port side of the first electromagnetic valve 110. The second connecting portion 116*b* is formed in a three-way joint like the first connecting portion 116*a*. The outside heat exchanger 103 is connected to another inflow/outflow port of the second connecting portion 116*b*. A second bypass flow path 114 is connected to the other inflow/outflow port of the second connecting portion 116*b*.

The outside heat exchanger 103 is an outside heat exchange unit that exchanges heat between the refrigerant flowing out of the second connecting portion 116*b* or the first expansion valve 104 and outside air blown by an outside air fan (not illustrated). The outside heat exchanger 103 is disposed on the front side of a drive unit chamber in the vehicle. For this reason, during traveling of the vehicle, the traveling air flowing into the drive unit chamber through a grill can be blown against the outside heat exchanger 103.

In a case where the outside air temperature is higher than the temperature of the refrigerant flowing through the outside heat exchanger 103, the outside heat exchanger 103 functions as a radiator that radiates heat of the refrigerant to the outside air. On the other hand, in a case where the outside air temperature is lower than the temperature of the refrigerant flowing through the outside heat exchanger 103, the outside heat exchanger functions as an evaporator (heat absorber) to absorb heat of the outside air into the refrigerant and evaporate the refrigerant.

The first expansion valve 104 is connected to the other inflow/outflow port of the outside heat exchanger 103. As the first expansion valve 104 of the refrigeration cycle device 100, the electric expansion valve 1 described above is used. As illustrated in FIG. 3, the first inflow/outflow port 64 of the first expansion valve 104 is connected to the other inflow/outflow port of the outside heat exchanger 103. Since the configuration of the first expansion valve 104 has already been described, description thereof will not be repeated.

One inflow/outflow port of the third connecting portion 116*c* is connected to the second inflow/outflow port 65 side of the first expansion valve 104. The third connecting portion 116*c* is also formed in a three-way joint. One inflow/outflow port of the evaporator 107 is connected to another inflow/outflow port of the third connecting portion 116*c*. The third expansion valve 106 is connected to the other inflow/outflow port of the third connecting portion 116*c*.

The evaporator 107 is disposed in the inside air conditioning unit described above, and is a cooling heat exchanger that exchanges heat between the blown air blown into the vehicle compartment and the refrigerant flowing into the evaporator 107. The evaporator 107 cools the blown air by evaporating the low-pressure refrigerant to exhibit a heat absorbing action. One inflow/outflow port of the fourth connecting portion 116*d* is connected to the other inflow/outflow port of the evaporator 107.

The fourth connecting portion 116*d* is formed in a three-way joint like the first connecting portion 116*a* described above. The first bypass flow path 113 is connected to another inflow/outflow port of the fourth connecting portion 116*d*. A third bypass flow path 115 is connected to the other inflow/outflow port of the fourth connecting portion 116*d*.

The first bypass flow path 113 is a refrigerant flow path connecting the first connecting portion 116*a* and the fourth connecting portion 116*d*. The second expansion valve 105 is disposed in the first bypass flow path 113. The second expansion valve 105 is a decompressor that decompresses the refrigerant flowing through the first bypass flow path 113 and adjusts the flow rate (mass flow rate) of the refrigerant flowing downstream. The specific configuration of the second expansion valve 105 may be similar to that of the electric expansion valve 1 described above, but a conventionally known mechanical expansion valve or the like may also be used.

As illustrated in FIG. 3, a refrigerant inlet of the third expansion valve 106 is connected to the other inflow/outflow port of the third connecting portion 116*c*. The third expansion valve 106 is a decompressor that decompresses the refrigerant flowing out of the other inflow/outflow port of the third connecting portion 116*c* and adjusts the flow rate (mass flow rate) of the refrigerant flowing downstream. The specific configuration of the third expansion valve 106 may be similar to that of the electric expansion valve 1 described above, but a conventionally known mechanical expansion valve or the like can also be used.

The chiller 108 is connected to a refrigerant outlet of the third expansion valve 106. The chiller 108 is a component of the refrigerant circuit and is also a component of a heating medium circuit (not illustrated). The chiller 108 is a water-refrigerant heat exchanger that exchanges heat between the low-pressure refrigerant decompressed by the third expansion valve 106 and the heating medium circulating in the heating medium circuit. The chiller 108 cools the heating medium by evaporating the low-pressure refrigerant to exhibit a heat absorbing action.

A battery mounted on the vehicle and an in-vehicle device are connected to the heating medium circuit. Therefore, the temperature of the battery or the in-vehicle device can be adjusted by circulating the heating medium subjected to temperature adjustment in the heating medium circuit. One inflow/outflow port of the fifth connecting portion 116*e* is connected to a refrigerant outlet of the chiller 108.

The fifth connecting portion 116*e* is formed in a three-way joint like the first connecting portion 116*a* described above. The third bypass flow path 115 is connected to another inflow/outflow port of the fifth connecting portion 116*e*. Another inflow/outflow port of the sixth connecting portion 116*f* is connected to the other inflow/outflow port of the fifth connecting portion 116*e*.

The third bypass flow path 115 is a refrigerant flow path connecting the fourth connecting portion 116*d* and the fifth connecting portion 116*e*. A third electromagnetic valve 112 is disposed in the third bypass flow path 115. The third electromagnetic valve 112 is an electromagnetic valve that opens and closes the third bypass flow path 115. Operation of the third electromagnetic valve 112 is controlled by a control voltage output from the control device described above.

The sixth connecting portion 116*f* is formed in a three-way joint like the first connecting portion 116*a* described above. As described above, the refrigerant outlet of the chiller 108 is connected to one inflow/outflow port of the sixth connecting portion 116*f*. As illustrated in FIG. 3, the second bypass flow path 114 is connected to another inflow/outflow port of the sixth connecting portion 116*f*.

The second bypass flow path 114 is a refrigerant flow path connecting the second connecting portion 116*b* and the sixth connecting portion 116*f*, and includes a second electromagnetic valve 111. The second electromagnetic valve 111 is an electromagnetic valve that opens and closes the second bypass flow path 114. Operation of the second electromagnetic valve 111 is controlled by a control voltage output from the control device described above.

An inlet side of the accumulator 109 is connected to the other inflow/outflow port of the sixth connecting portion 116*f*. The accumulator 109 is a low-pressure gas-liquid separator that separates the refrigerant flowing into the accumulator into gas and liquid and stores a surplus liquid-phase refrigerant in the cycle. A suction port side of the compressor 101 is connected to a gas-phase refrigerant outlet of the accumulator 109.

Next, the inside air conditioning unit 120 constituting a part of the vehicle air conditioner together with the refrigeration cycle device 100 will be described with reference to the drawings. The inside air conditioning unit 120 is an air distribution unit in which a plurality of components are integrated in order to blow blown air adjusted to an appropriate temperature for air conditioning in the vehicle compartment to an appropriate location in the vehicle compartment. The inside air conditioning unit 120 is disposed inside the instrument panel (instrument panel) at the foremost part of the vehicle compartment.

Figure 4:
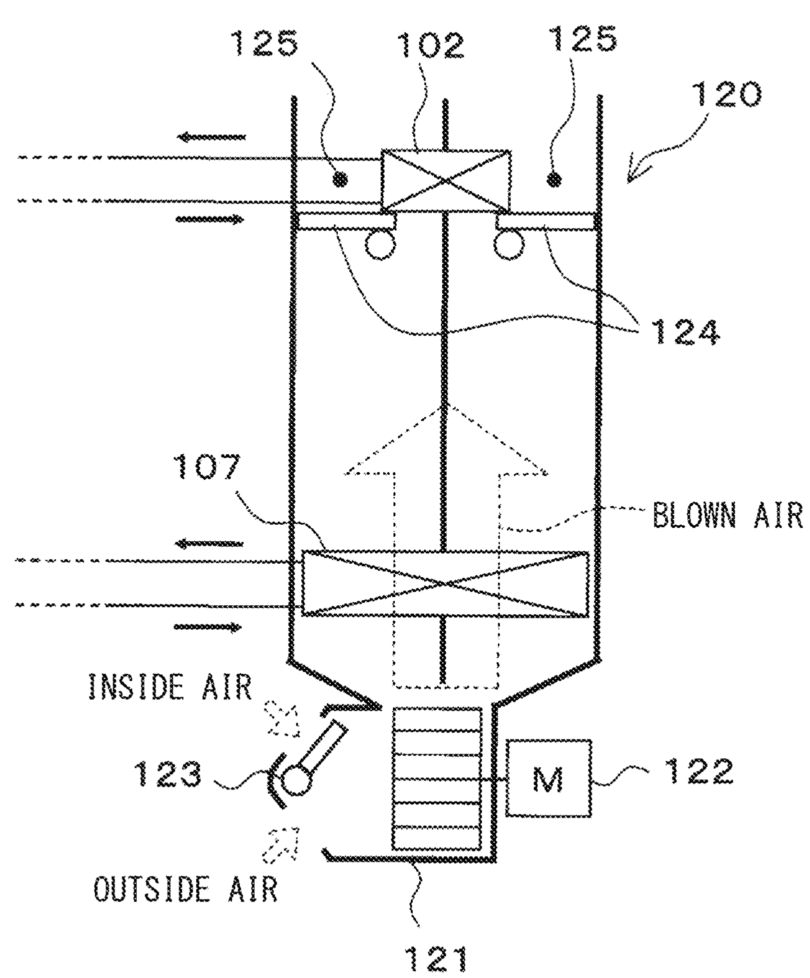
FIG. 4 is a schematic configuration diagram of an inside air conditioning unit according to the first embodiment.
Figure 5:
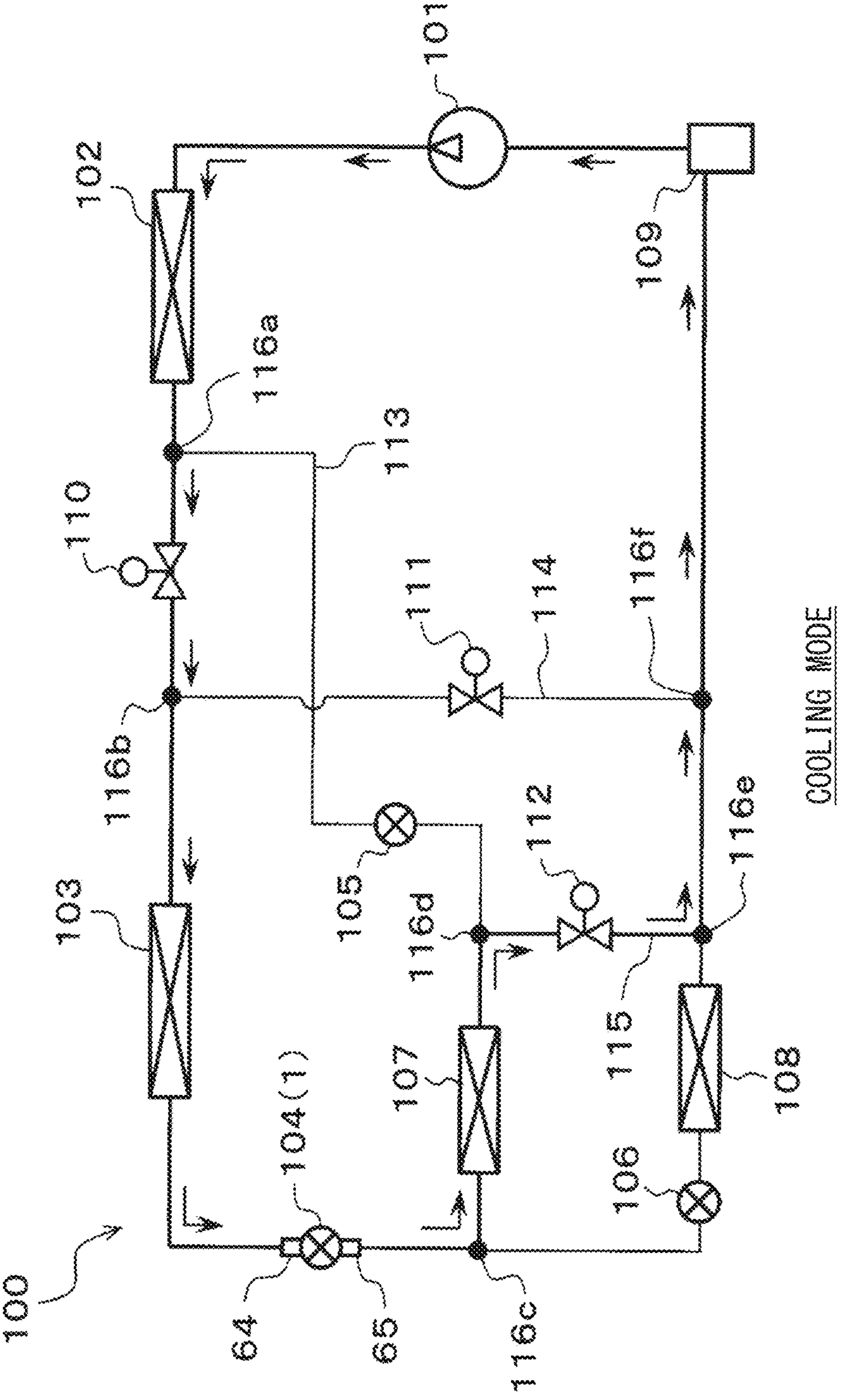
FIG. 5 is an explanatory diagram illustrating a cooling mode of the refrigeration cycle device according to the first embodiment.

As illustrated in FIG. 4, the inside air conditioning unit 120 is formed by housing the inside blower 122, the evaporator 107, the inside condenser 102, and the like in an air conditioning case 121 forming an air passage for blown air. The air conditioning case 121 is made of resin (for example, polypropylene) with a certain degree of elasticity and excellent strength.

An inside air and outside air switching device 123 is disposed on the most upstream side of blown air flow in the air conditioning case 121. The inside air and outside air switching device 123 switchingly introduces inside air (that is, air inside vehicle compartment) and outside air (that is, air outside vehicle compartment) into the air conditioning case 121. Operation of the inside air and outside air switching device 123 is controlled by a control signal output from the control device.

The inside blower 122 is disposed on the blown air flow downstream side of the inside air and outside air switching device 123. The inside blower 122 is an inside blower unit that blows air sucked through the inside air and outside air switching device 123 toward the vehicle compartment. The rotation speed (that is blowing capacity) of the inside blower 122 is controlled by a control signal output from the control device.

The evaporator 107 and the inside condenser 102 are arranged on the blown air flow downstream side of the inside blower 122. The evaporator 107 is disposed on the blown air flow upstream side of the inside condenser 102. A cold air bypass passage 125 through which the blown air having passed through the evaporator 107 flows while bypassing the inside condenser 102 is formed in the air conditioning case 121.

An air mix door 124 is disposed on the blown air flow downstream side of the evaporator 107 in the air conditioning case 121 and on the blown air flow upstream side of the inside condenser 102 and the cold air bypass passage 125 in the air conditioning case 121.

The air mix door 124 is an air volume ratio adjustment unit that adjusts the air volume ratio between the air volume of the blown air passing through the inside condenser 102 and the air volume of the blown air passing through the cold air bypass passage 125 in the blown air having passed through the evaporator 107. Operation of an actuator for driving the air mix door 124 is controlled by a control signal output from the control device.

A mixing space is formed on the blown air flow downstream side of the inside condenser 102 and the cold air bypass passage 125 in the air conditioning case 121. The mixing space is a space where the blown air heated by the inside condenser 102 and the blown air that has passed through the cold air bypass passage 125 and has not been heated are mixed.

Therefore, in the inside air conditioning unit 120, the air mix door 124 adjusts the air volume ratio, thereby adjusting the temperature of the blown air (that is, conditioned air) mixed in the mixing space and blown into the vehicle compartment.

Furthermore, an opening hole for blowing the blown air mixed and subjected to temperature adjustment in the mixing space into the vehicle compartment is disposed at the blown air flow downstream portion of the air conditioning case 121. As the opening hole, a face opening hole, a foot opening hole, and a defroster opening hole (all not illustrated) are provided.

The face opening hole is an opening hole for blowing conditioned air toward the upper body of an occupant in the vehicle compartment. The foot opening hole is an opening hole for blowing conditioned air toward the feet of the occupant. The defroster opening hole is an opening hole for blowing conditioned air toward the inside surface of the vehicle front window glass.

A face door, a foot door, and a defroster door (all not illustrated) are arranged on the blown air flow upstream side of the face opening hole, the foot opening hole, and the defroster opening hole, respectively. The face door adjusts the opening area of the face opening hole. The foot door adjusts the opening area of the foot opening hole. The defroster door adjusts the opening area of the defroster opening hole.

Each of the face door, the foot door, and the defroster door is a blowing outlet mode switching portion that switches a blowing outlet mode. These doors are coupled to the common electric actuator for driving a blowing outlet mode door via a link mechanism or the like, and are rotationally operated in conjunction therewith. Operation of the electric actuator for driving a blowing outlet mode door is controlled by a control signal output from the control device.

Therefore, in the inside air conditioning unit 120, the blowing outlet mode switching portion switches the opening hole to be opened and closed to switch the blowing outlet mode, so that the conditioned air adjusted to an appropriate temperature can be blown from the mixing space to an appropriate location in the vehicle compartment.

In the refrigeration cycle device 100 in which the electric expansion valve 1 is used as the first expansion valve 104, by switching the configuration of the refrigerant circuit and changing the operation mode, the air conditioning mode in the vehicle compartment and the mode of temperature adjustment of the battery and the in-vehicle device can be variously changed.

Specifically, the refrigeration cycle device 100 can switch to various operation modes including a cooling mode in which the blown air supplied to the vehicle compartment is cooled by the refrigeration cycle and a heating mode in which the blown air supplied to the vehicle compartment is heated by the refrigeration cycle.

An operation in the cooling mode that is one of the operation modes in the refrigeration cycle device 100 will be described with reference to FIG. 5. In the refrigeration cycle device 100 in the cooling mode, the refrigerant discharge capacity of the compressor 101 and the blowing capacity of the blower are controlled so as to exhibit predetermined capacities.

The first expansion valve 104 is controlled to be in a throttled state where the decompression action is exhibited, and the second expansion valve 105 and the third expansion valve 106 are controlled to be in a fully closed state. The first electromagnetic valve 110 and the third electromagnetic valve 112 are controlled to be in a valve open state, and the second electromagnetic valve 111 is controlled to be in a valve closed state. The inside air conditioning unit 120 is controlled in a manner that the air mix door 124 closes the downstream side of the inside condenser 102 and the blown air flows through the cold air bypass passage 125.

As a result, in the refrigeration cycle device 100 in the cooling mode, the refrigerant discharged from the discharge port of the compressor 101 flows through the inside condenser 102, the first connecting portion 116*a*, the first electromagnetic valve 110, the second connecting portion 116*b*, and the outside heat exchanger 103 in this order. In the cooling mode, the flow of the blown air bypasses the inside condenser 102 under the control of the air mix door 124. Therefore, the heat of the refrigerant is not radiated in the inside condenser 102, but is radiated to the outside air in the outside heat exchanger 103.

The refrigerant flowing out of the outside heat exchanger 103 flows from the first inflow/outflow port 64 of the first expansion valve 104 configured by the electric expansion valve 1 to the valve chamber 62, and flows out of the second inflow/outflow port 65 in a decompressed state.

The refrigerant flowing out of the second inflow/outflow port 65 of the first expansion valve 104 flows through the evaporator 107, the fourth connecting portion 116*d*, the third electromagnetic valve 112, the fifth connecting portion 116*e*, the accumulator 109, and the compressor 101 in this order, and circulates in the refrigerant circuit of the refrigeration cycle device 100. When flowing through the evaporator 107, the refrigerant absorbs heat from the blown air flowing through the inside air conditioning unit 120 and evaporates.

As a result, in the refrigeration cycle device 100 in the cooling mode, a vapor compression refrigeration cycle is configured in which the outside heat exchanger 103 functions as a radiator that radiates heat from the high-pressure refrigerant, and the evaporator 107 functions as an evaporator that evaporates the refrigerant decompressed by the first expansion valve 104. In the refrigeration cycle device 100 in the cooling mode, the blown air cooled by the refrigeration cycle can be supplied into the vehicle compartment to cool the vehicle compartment.

As described above, in the cooling mode of the refrigeration cycle device 100, the refrigerant flows into the valve chamber 62 from the first inflow/outflow port 64 of the first expansion valve 104, is decompressed in the valve chamber 62, and then flows out of the second inflow/outflow port 65. That is, the cooling mode corresponds to a first operation mode in which the refrigerant flows through the first inflow/outflow port 64, the valve chamber 62, and the second inflow/outflow port 65 in this order in the electric expansion valve 1.

Figure 6:
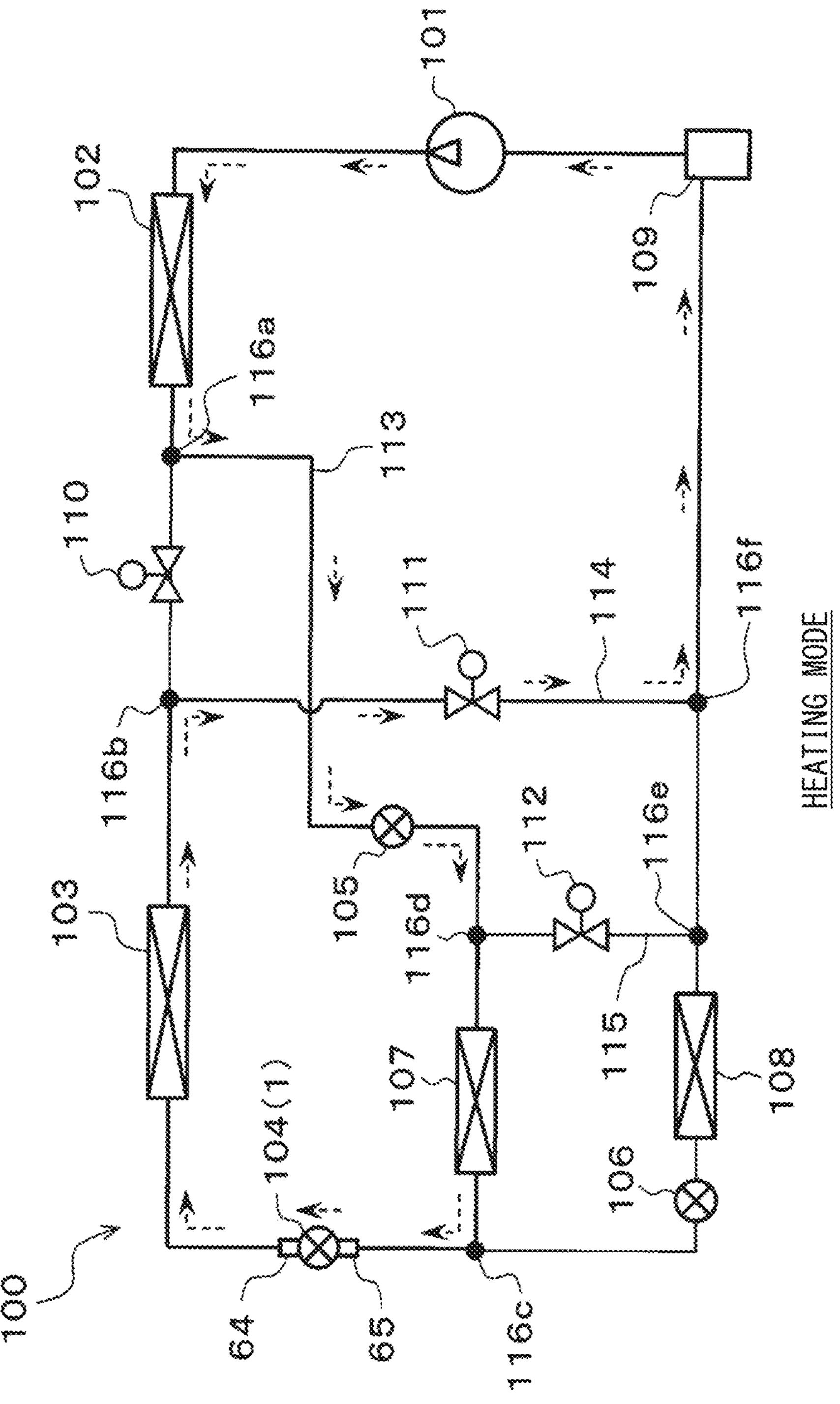
FIG. 6 is an explanatory diagram illustrating a heating mode of the refrigeration cycle device according to the first embodiment.

Next, an operation in the heating mode that is another operation mode of the refrigeration cycle device 100 will be described with reference to FIG. 6. In the refrigeration cycle device 100 in the heating mode, the refrigerant discharge capacity of the compressor 101 and the blowing capacity of the blower are controlled so as to exhibit predetermined capacities.

The first expansion valve 104 and the second expansion valve 105 are controlled to be in the throttled state where the decompression action is exhibited, and the third expansion valve 106 is controlled to be in the fully closed state. The second electromagnetic valve 111 is controlled to be in the valve open state, and the first electromagnetic valve 110 and the third electromagnetic valve 112 are controlled to be in the valve closed state. The inside air conditioning unit 120 is controlled in a manner that the air mix door 124 closes the cold air bypass passage 125 and the blown air flows through the inside condenser 102.

As a result, in the refrigeration cycle device 100 in the heating mode, the refrigerant discharged from the discharge port of the compressor 101 flows through the inside condenser 102, the first connecting portion 116*a*, the second expansion valve 105, the fourth connecting portion 116*d*, the evaporator 107, and the third connecting portion 116*c* in this order. In the heating mode, the blown air flows through the inside condenser 102 under the control of the air mix door 124. Therefore, in the inside condenser 102, the heat of the refrigerant is radiated, and the blown air is heated.

The refrigerant flowing out of the inside condenser 102 is decompressed by the second expansion valve 105, and then flows through the evaporator 107. The refrigerant flowing out of the second expansion valve 105 absorbs heat from the blown air flowing through the inside air conditioning unit 120 at the evaporator 107, and flows into the third connecting portion 116*c*.

The refrigerant flowing out of the third connecting portion 116*c* flows from the second inflow/outflow port 65 of the first expansion valve 104 configured by the electric expansion valve 1 to the valve chamber 62, and flows out of the first inflow/outflow port 64 in a decompressed state.

The refrigerant flowing out of the first inflow/outflow port 64 of the first expansion valve 104 flows through the outside heat exchanger 103, the second connecting portion 116*b*, the second electromagnetic valve 111, the sixth connecting portion 116*f*, the accumulator 109, and the compressor 101 in this order, and circulates in the refrigerant circuit of the refrigeration cycle device 100. When flowing through the outside heat exchanger 103, the refrigerant absorbs heat from the outside air and evaporates.

As a result, in the refrigeration cycle device 100 in the heating mode, a vapor compression refrigeration cycle is configured in which the inside condenser 102 functions as a radiator that radiates heat from the high-pressure refrigerant, and the outside heat exchanger 103 and the evaporator 107 function as evaporators that evaporate the decompressed refrigerant. In the refrigeration cycle device 100 in the heating mode, the blown air heated by the refrigeration cycle can be supplied into the vehicle compartment to heat the vehicle compartment.

As described above, in the heating mode of the refrigeration cycle device 100, the refrigerant flows into the valve chamber 62 from the second inflow/outflow port 65 of the first expansion valve 104, is decompressed in the valve chamber 62, and then flows out of the first inflow/outflow port 64. That is, the heating mode corresponds to a second operation mode in which the refrigerant flows through the second inflow/outflow port 65, the valve chamber 62, and the first inflow/outflow port 64 in this order in the electric expansion valve 1.

By using the electric expansion valve 1 as the first expansion valve 104, it is possible to handle a mode in which the refrigerant flows from the outside heat exchanger 103 to the third connecting portion 116*c* and a mode in which the refrigerant flows from the third connecting portion 116*c* to the outside heat exchanger 103 without adding complicated refrigerant pipes and configurations. Complicated refrigerant pipes and configurations are not added in the refrigeration cycle device 100, which leads to a reduction in the space occupied by the refrigeration cycle device 100. That is, the refrigeration cycle device 100 can contribute to a compact vehicle air conditioner having a small occupied space in the vehicle.

Here, a case where a conventionally known electric expansion valve (for example, expansion valve described in Japanese Patent No. 5022960) is used as the first expansion valve 104 in the refrigeration cycle device 100 will be examined.

As described above, in the cooling mode of the refrigeration cycle device 100, the refrigerant needs to be decompressed by the first expansion valve 104, and also needs to flow from the outside heat exchanger 103 to the third connecting portion 116*c* via the first expansion valve 104. On the other hand, in the heating mode of the refrigeration cycle device 100, the refrigerant needs to be decompressed by the first expansion valve 104, and also needs to flow from the third connecting portion 116*c* to the outside heat exchanger 103 via the first expansion valve 104.

The conventionally known electric expansion valve (hereinafter, referred to as conventional expansion valve) must be disposed in a manner that the refrigerant flows from the first inflow/outflow port 64 to the second inflow/outflow port 65 via the valve chamber 62. In the conventional expansion valve, since the ball is disposed between the valve body and the output shaft, drive force is not directly transmitted to the valve body at the time of the valve opening operation, so that the valve is opened by the action of biasing force of the coil spring. Therefore, in a case where the conventional expansion valve is disposed in a manner that the refrigerant flows from the second inflow/outflow port 65 to the first inflow/outflow port 64 via the valve chamber 62, the accuracy of movement control of the valve body becomes poor, and the decompression performance and the flow rate adjustment performance of the first expansion valve 104 cannot be sufficiently exhibited.

In a case where the conventional expansion valve is used as the first expansion valve 104 in the refrigeration cycle device 100 described above, the refrigeration cycle device 100 needs to set the flow of the refrigerant between the outside heat exchanger 103 and the third connecting portion 116*c* to a direction suitable for the cooling mode or the heating mode. At the same time, in the refrigeration cycle device 100, it is necessary to dispose the conventional expansion valve in a manner that the refrigerant flows from the first inflow/outflow port 64 to the second inflow/outflow port 65 via the valve chamber 62 in order to exhibit the decompression performance of the first expansion valve 104 configured by the conventional expansion valve.

Figure 7:
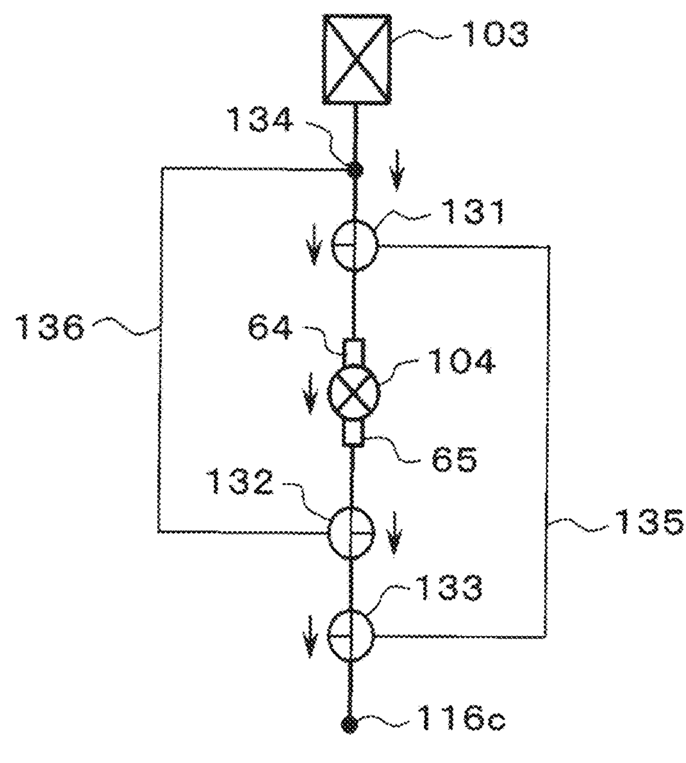
FIG. 7 is an explanatory diagram illustrating an operation in the cooling mode in a case where a conventional expansion valve is applied to the refrigeration cycle device.
Figure 8:
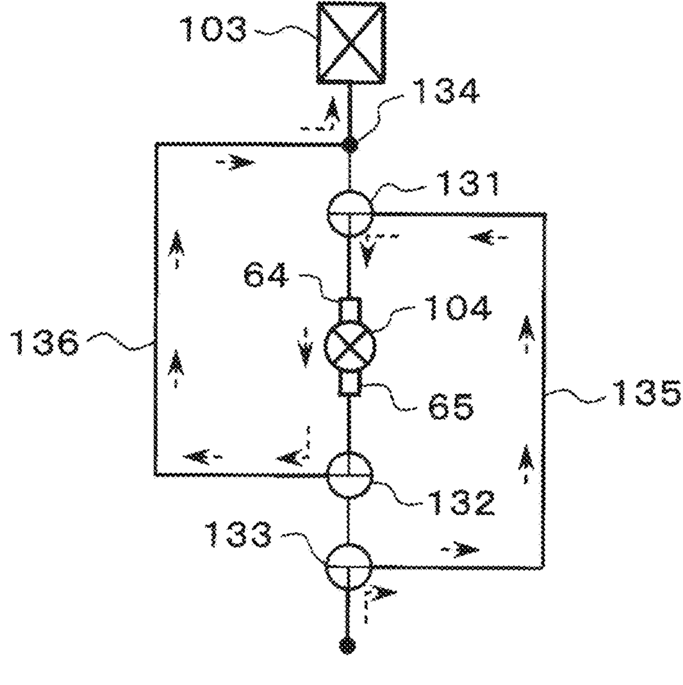
FIG. 8 is an explanatory diagram illustrating an operation in the heating mode in a case where the conventional expansion valve is applied to the refrigeration cycle device.

When the configuration between the outside heat exchanger 103 and the third connecting portion 116*c* in the refrigeration cycle device 100 is changed to satisfy the above conditions, the configuration illustrated in FIGS. 7 and 8 is obtained. That is, as the configuration between the outside heat exchanger 103 and the third connecting portion 116*c*, it is necessary to add first three-way valve 131 to third three-way valve 133, a three-way joint 134, a first bypass passage 135, and a second bypass passage 136.

The configuration between the outside heat exchanger 103 and the third connecting portion 116*c* will be specifically described. One inflow/outflow port of the three-way joint 134 is connected to an inflow/outflow port of the outside heat exchanger 103. The three-way joint 134 has, for example a configuration similar to the first connecting portion 116*a* or the like. The second bypass passage 136 is connected to another inflow/outflow port of the three-way joint 134. One inflow/outflow port of the first three-way valve 131 is connected to the other inflow/outflow port of the three-way joint 134.

The first three-way valve 131 is a multi-way valve having three inflow/outflow ports and capable of switching flow paths by selectively connecting at least two inflow/outflow ports. Operation of the first three-way valve 131 is controlled by a control voltage output from the control device of the refrigeration cycle device 100. The first bypass passage 135 is connected to another inflow/outflow port of the first three-way valve 131. The first inflow/outflow port 64 of the first expansion valve 104 configured by the conventional expansion valve is connected to the other inflow/outflow port of the first three-way valve 131.

The first expansion valve 104 configured by the conventional expansion valve can use a configuration similar to the electric expansion valve 1 described above except for the configuration of the valve body portion 40. As the configuration of the valve body portion in the conventional expansion valve, for example, the configuration described in Japanese Patent No. 5022960 can be used.

One inflow/outflow port of the second three-way valve 132 is connected to the second inflow/outflow port 65 of the first expansion valve 104. The second three-way valve 132 has a configuration similar to the first three-way valve 131. The second bypass passage 136 is connected to another inflow/outflow port of the second three-way valve 132. The second bypass passage 136 is a passage between three-way joint 134 and the second three-way valve 132 for allowing the refrigerant to flow while bypassing the first three-way valve 131 and the first expansion valve 104.

One inflow/outflow port of the third three-way valve 133 is connected to the other inflow/outflow port of the second three-way valve 132. The third three-way valve 133 has a configuration similar to the first three-way valve 131 and the second three-way valve 132. The first bypass passage 135 is connected to another inflow/outflow port of the third three-way valve 133. The first bypass passage 135 is a passage between the first three-way valve 131 and the third three-way valve 133 for allowing the refrigerant to flow while bypassing the second three-way valve 132 and the first expansion valve 104. One inflow/outflow port of the third connecting portion 116*c* is connected to the other inflow/outflow port of the third three-way valve 133.

The cooling mode in the refrigeration cycle device 100 in a case where the conventional expansion valve is used as the first expansion valve 104 will be described focusing on the flow of the refrigerant flowing from the outside heat exchanger 103 to the third connecting portion 116*c* via the first expansion valve 104.

As described above, in the cooling mode in the refrigeration cycle device 100, the refrigerant flows through the outside heat exchanger 103, the first expansion valve 104, and the third connecting portion 116*c* in this order. Since the flow of the refrigerant in other portions has already been described, description thereof will not be repeated.

In the cooling mode in the refrigeration cycle device 100 in a case where the conventional expansion valve is used as the first expansion valve 104, the operations of the first three-way valve 131 to the third three-way valve 133 are controlled in addition to the operations of the components described above. For the first three-way valve 131, the inflow/outflow port on the three-way joint 134 side communicates with the inflow/outflow port on the first expansion valve 104 side, and the inflow/outflow port on the first bypass passage 135 side is closed.

In the second three-way valve 132, the inflow/outflow port on the first expansion valve 104 side communicates with the inflow/outflow port on the third three-way valve 133 side, and the inflow/outflow port on the second bypass passage 136 side is closed. In the third three-way valve 133, the inflow/outflow port on the second three-way valve 132 communicates with the inflow/outflow port on the third connecting portion 116*c*, and the inflow/outflow port on the first bypass passage 135 side is closed.

As illustrated in FIG. 7, by controlling the operations of the first three-way valve 131 to the third three-way valve 133, in the cooling mode in this case, the refrigerant flowing out of the outside heat exchanger 103 flows through the three-way joint 134 and the first three-way valve 131 in this order. The refrigerant flowing out of the first three-way valve 131 flows into the valve chamber from the first inflow/outflow port 64 of the conventional expansion valve, is decompressed in the valve chamber, and then flows out of the second inflow/outflow port 65. The refrigerant flowing out of the second inflow/outflow port 65 passes through the second three-way valve 132 and the third three-way valve 133, and flows into the third connecting portion 116*c*.

Even in a case where the conventional expansion valve is used as the first expansion valve 104, by adding the configuration of the first three-way valve 131 and the like and executing operation control, the cooling mode in the refrigeration cycle device 100 can be implemented similarly to the case where the electric expansion valve 1 is used as the first expansion valve 104 described above.

Next, the heating mode in the refrigeration cycle device 100 in a case where the conventional expansion valve is used as the first expansion valve 104 will be described focusing on the flow of the refrigerant flowing from the third connecting portion 116*c* to the outside heat exchanger 103 via the first expansion valve 104.

As described above, in the heating mode in the refrigeration cycle device 100, the refrigerant flows through the third connecting portion 116*c*, the first expansion valve 104, and the outside heat exchanger 103 in this order. Since the flow of the refrigerant in other portions has already been described, description thereof will not be repeated.

In the heating mode in the refrigeration cycle device 100 in a case where the conventional expansion valve is used as the first expansion valve 104, the operations of the first three-way valve 131 to the third three-way valve 133 are controlled in addition to the operations of the components described above. For the first three-way valve 131, the inflow/outflow port on the first bypass passage 135 side communicates with the inflow/outflow port on the first expansion valve 104 side, and the inflow/outflow port on the three-way joint 134 side is closed.

In the second three-way valve 132, the inflow/outflow port on the first expansion valve 104 side communicates with the inflow/outflow port on the second bypass passage 136 side, and the inflow/outflow port on the third three-way valve 133 side is closed. In the third three-way valve 133, the inflow/outflow port on the first bypass passage 135 side communicates with the inflow/outflow port on the third connecting portion 116*c* side, and the inflow/outflow port on the second three-way valve 132 side is closed.

As illustrated in FIG. 8, by controlling the operations of the first three-way valve 131 to the third three-way valve 133, in the heating mode in this case, the refrigerant flowing out of the third connecting portion 116*c* flows through the three-way valve 133, the first bypass passage 135, and the first three-way valve 131 in this order. The refrigerant flowing out of the first three-way valve 131 flows into the valve chamber from the first inflow/outflow port 64 of the conventional expansion valve, is decompressed in the valve chamber, and then flows out of the second inflow/outflow port 65. The refrigerant flowing out of the second inflow/outflow port 65 passes through the second three-way valve 132, the second bypass passage 136, and the three-way joint 134, and flows into the outside heat exchanger 103.

Even in a case where the conventional expansion valve is used as the first expansion valve 104, by adding the configuration such as the first three-way valve 131 and executing operation control, the heating mode in the refrigeration cycle device 100 can be implemented similarly to the case where the electric expansion valve 1 is used as the first expansion valve 104 described above.

In other words, in a case where the conventional expansion valve is used as the first expansion valve 104, the configuration such as the first three-way valve 131 needs to be added to the refrigeration cycle device 100 in order to achieve an effect equivalent to that in a case where the electric expansion valve 1 is used as the first expansion valve 104. That is, in a case where the electric expansion valve 1 is used as the first expansion valve 104, the first three-way valve 131 and the like are unnecessary, so that the refrigeration cycle device 100 can be made compact.

In a case where the conventional expansion valve is used as the first expansion valve 104, the operation control of the first three-way valve 131 to the third three-way valve 133 is required for the refrigeration cycle device 100 in order to achieve an effect equivalent to that in a case where the electric expansion valve 1 is used as the first expansion valve 104. In other words, in a case where the electric expansion valve 1 is used as the first expansion valve 104, it is not necessary to control the operation of the first three-way valve 131 and the like, so that the processing load on the control device for the operation of the refrigeration cycle device 100 can be reduced.

As described above, according to the electric expansion valve 1 of the first embodiment, the end of the output shaft 44 and the valve body 41 are connected to be integrally displaceable by the joint portion 50, and thus drive force output from the drive motor 11 can integrally displace the valve body portion 40. As a result, the electric expansion valve 1 can adjust the decompression amount and the flow rate of the refrigerant in response to both the case where the refrigerant flows through the first inflow/outflow port 64, the valve chamber 62, and the second inflow/outflow port 65 in this order and the case where the refrigerant flows through the second inflow/outflow port 65, the valve chamber 62, and the first inflow/outflow port 64 in this order.

As illustrated in FIG. 2, the joint portion 50 of the electric expansion valve 1 according to the first embodiment is integrally attached to the valve body 41, and includes the cap member 42 having the insertion hole 42*a* and the locking portion 45 formed at the end of the output shaft 44. The locking portion 45 has a portion extending larger than at least the maximum diameter of the insertion hole 42*a*.

In a case where the drive force from the drive motor 11 is transmitted and the output shaft 44 moves upward so as to be separated from the valve seat 63, the locking portion 45 of the output shaft 44 abuts on the opening edge of the insertion hole 42*a* in the cap member 42 from below. As a result, in the electric expansion valve 1, the drive force of the drive motor 11 is transmitted to the valve body 41 via the joint portion 50, and the valve body 41 can be pulled upward so as to be separated from the valve seat 63.

In a case where the drive force from the drive motor 11 is transmitted and the output shaft 44 moves downward so as to approach the valve seat 63, the abutting projection 44*a* abuts on the upper surface of the valve body 41 in the internal space between the upper surface of the cap member 42 and the upper surface of the valve body 41. As a result, in the electric expansion valve 1, the drive force of the drive motor 11 is transmitted to the valve body 41, and the valve body 41 can be pushed down with respect to the valve seat 63 located below the valve body.

That is, according to the electric expansion valve 1 of the first embodiment, the drive force generated by the drive unit 10 can be transmitted to the valve body 41 via the joint portion 50, and the displacement amount of the valve body 41 with respect to the valve seat 63 can be appropriately controlled.

The valve body portion 40 of the electric expansion valve 1 according to the first embodiment includes the centering mechanism 55 that performs adjustment in a manner that the axial center of the output shaft 44 matches the axial center of the valve body 41. As illustrated in FIG. 2, the centering mechanism 55 of the electric expansion valve 1 according to the first embodiment includes the recess 41*a* formed on the upper surface of the valve body 41 and the abutting projection 44*a* formed at the lower end of the output shaft 44.

Therefore, in a case where the output shaft 44 moves downward so as to approach the valve seat 63 and presses the valve body 41, the abutting projection 44*a* constituting the centering mechanism 55 is fitted into the recess 41*a* formed on the upper surface of the valve body 41. As a result, the valve body 41 can be pressed against the valve seat 63 by the output shaft 44 in a state where the axial center of the output shaft 44 and the axial center of the valve body 41 match each other. As a result, the electric expansion valve 1 can appropriately transmit the drive force transmitted to the output shaft 44 to the valve body 41, and can reliably exhibit the decompression function and flow rate adjustment function of the electric expansion valve 1.

According to the refrigeration cycle device 100 of the first embodiment, the electric expansion valve 1 is used as the first expansion valve 104, and the drive force of the drive motor 11 can be directly transmitted to the valve body portion 40 by the joint portion 50 and the valve body portion can be integrally displaced. As a result, the refrigeration cycle device 100 according to the first embodiment can switch to the cooling mode as the first operation mode illustrated in FIG. 5 and to the heating mode as the second operation mode illustrated in FIG. 6.

As illustrated in FIGS. 7 and 8, in a case where the conventional expansion valve is used as the first expansion valve 104, it is necessary to add configurations such as the first three-way valve 131 to the third three-way valve 133, the three-way joint 134, the first bypass passage 135, and the second bypass passage 136. In order to exhibit effects similar to those in the refrigeration cycle device 100 using the electric expansion valve 1, it is necessary to further control the operations of the first three-way valve 131 to the third three-way valve 133. In this regard, according to the refrigeration cycle device 100 of the first embodiment, the electric expansion valve 1 is used as the first expansion valve 104, and thus the configuration of the refrigeration cycle device 100 can be made compact, and at the same time, the load on the operation of the refrigeration cycle device 100 can be further reduced.

Second Embodiment

Next, a second embodiment different from the embodiment described above will be described with reference to FIG. 9. The second embodiment is different from the first embodiment in the configuration of the joint portion 50 in the valve body portion 40 of the electric expansion valve 1. Therefore, the configuration of the joint portion 50 according to the second embodiment will be described in detail. Other configurations of the electric expansion valve 1 and the refrigeration cycle device 100 are similar to those of the first embodiment, and thus description thereof will not be repeated.

Figure 9:
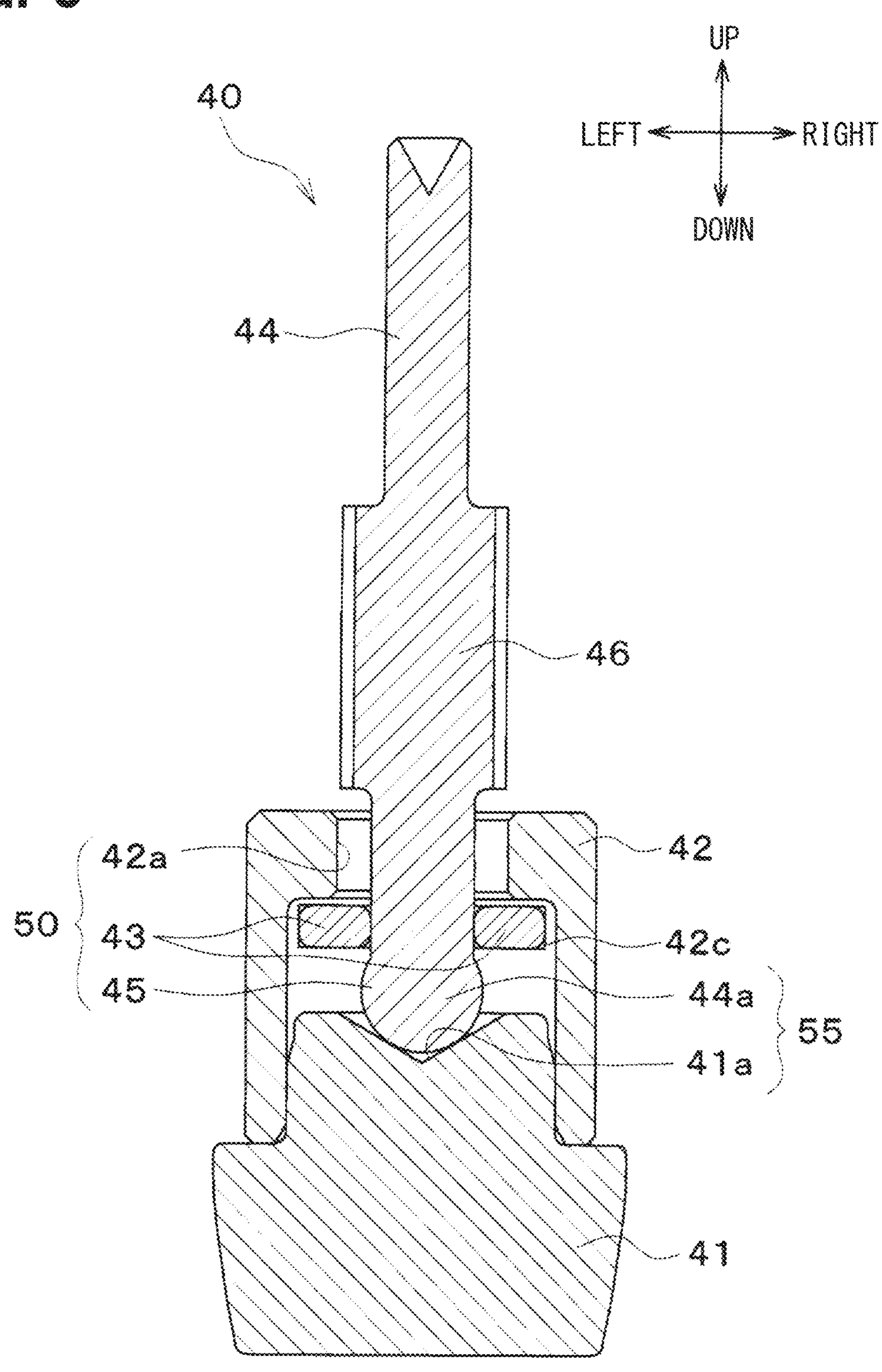
FIG. 9 is an enlarged cross-sectional view illustrating a configuration of a joint portion in an electric expansion valve according to a second embodiment.

As illustrated in FIG. 9, the joint portion 50 of the electric expansion valve 1 according to the second embodiment includes the cap member 42 integrally attached to the valve body 41, the locking portion 45 formed at the lower end of the output shaft 44, and a regulating member 43 attached to the cap member 42.

The cap member 42 according to the second embodiment is a cylindrical member integrally attached to the upper surface side of the valve body 41, similarly to the first embodiment. As illustrated in FIG. 9, the insertion hole 42*a* is formed on the upper surface side of the cap member 42, and the end of the output shaft 44 is inserted into the insertion hole 42*a*. The opening area of the insertion hole 42*a* according to the second embodiment is formed to be larger than the horizontal cross-sectional area of the spherical locking portion 45 formed at the end of the output shaft 44.

A pair of attachment openings 42*c* is formed on the side surface of the cap member 42 so as to face each other in the horizontal direction. The regulating member 43 is attached to the pair of attachment openings 42*c*. One end of the regulating member 43 is fixed in one of the pair of attachment openings 42*c*, and the other end of the regulating member 43 is fixed in the other one of the pair of attachment openings 42*c*. The regulating member 43 is attached to the pair of attachment openings 42*c*, so that the opening area of the insertion hole 42*a* of the cap member 42 is made smaller than the maximum outer shape of the locking portion 45 of the output shaft 44 in the axial direction of the output shaft 44.

The locking portion 45 according to the second embodiment is an outer edge portion in the horizontal direction of the spherical portion formed at the lower end of the output shaft 44. The lower portion of the spherical portion in the output shaft 44 corresponds to the abutting projection 44*a* in the second embodiment.

As a result, in a case where drive force from the drive motor 11 is transmitted and the output shaft 44 moves upward so as to be separated from the valve seat 63, the locking portion 45 of the output shaft 44 abuts on the regulating member 43 attached to the attachment opening 42*c* of the cap member 42 from below. As described above, the regulating member 43 is attached to the cap member 42, and the cap member 42 is integrally attached to the valve body 41. Therefore, the drive force of the drive motor 11 is transmitted to the valve body 41 by contact between the locking portion 45 of the output shaft 44 and the regulating member 43.

As a result, in the electric expansion valve 1 according to the second embodiment, the drive force of the drive motor 11 is transmitted to the valve body 41 via the joint portion 50, and the valve body 41 can be pulled upward so as to be separated from the valve seat 63.

The case where the drive force from the drive motor 11 is transmitted and the output shaft 44 moves downward so as to approach the valve seat 63 is similar to that in the first embodiment described above, and thus, description thereof will not be repeated.

As a result, the electric expansion valve 1 according to the second embodiment can exhibit a function as an expansion valve in both the case where the refrigerant flows from the first inflow/outflow port 64 to the second inflow/outflow port 65 via the valve chamber 62 and the case where the refrigerant flows from the second inflow/outflow port 65 to the first inflow/outflow port 64 via the valve chamber 62.

As described above, according to the electric expansion valve 1 of the second embodiment, even in a case where the electric expansion valve 1 includes the spherical locking portion 45, the cap member 42, and the regulating member 43, it is possible to obtain the operational effects obtained from the configuration and operation common to the embodiment described above.

Third Embodiment

Next, a third embodiment different from the embodiments described above will be described with reference to FIG. 10. The electric expansion valve 1 according to the third embodiment is different from the embodiments described above in the configuration of the joint portion 50 in the valve body portion 40 of the electric expansion valve 1. Therefore, the configuration of the joint portion 50 according to the third embodiment will be described in detail. Other configurations of the electric expansion valve 1 and the refrigeration cycle device 100 are similar to those of the embodiments described above, and thus description thereof will not be repeated.

Figure 10:
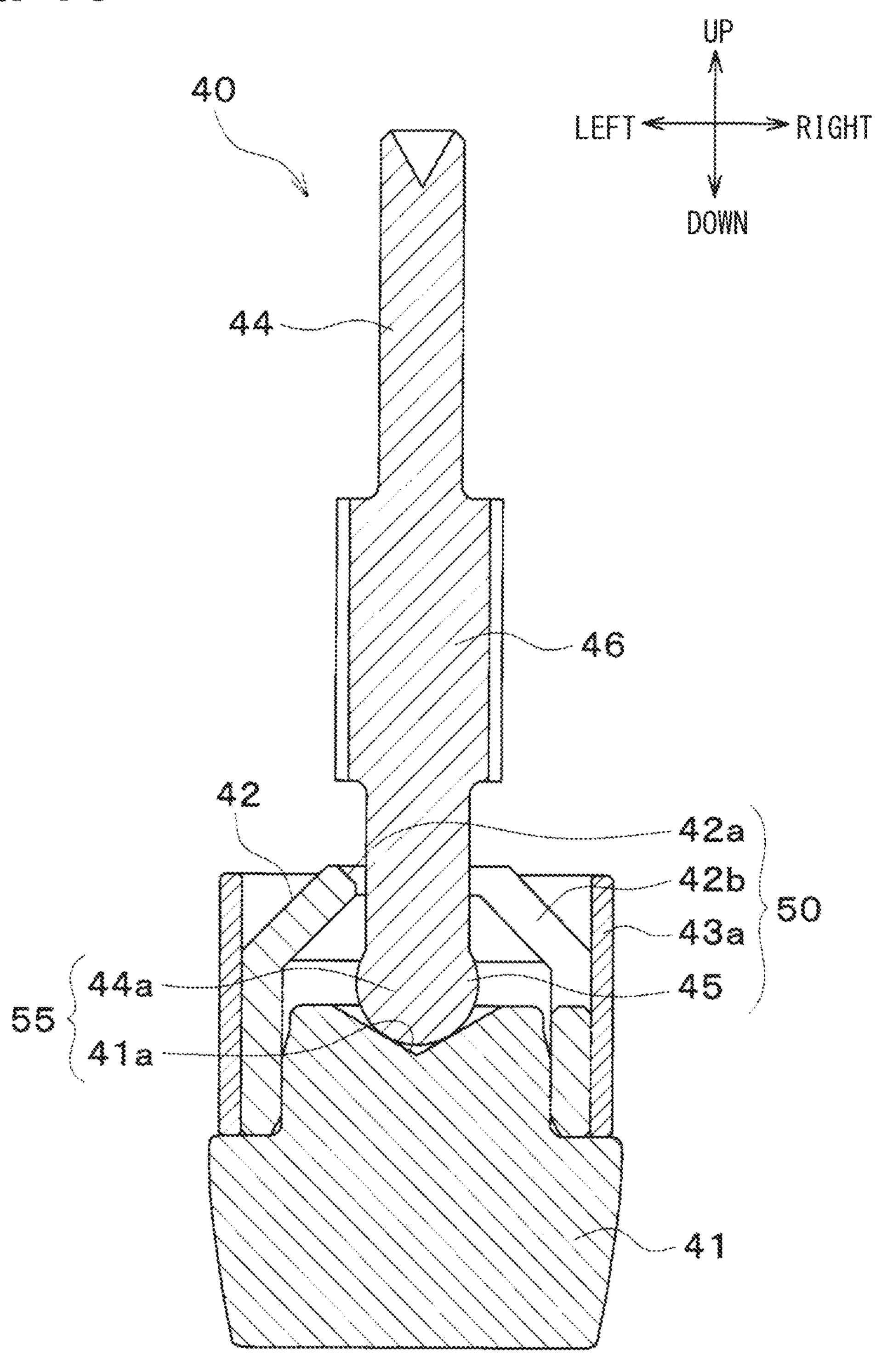
FIG. 10 is an enlarged cross-sectional view illustrating a configuration of a joint portion in an electric expansion valve according to a third embodiment.

As illustrated in FIG. 10, the joint portion 50 of the electric expansion valve 1 according to the third embodiment includes the cap member 42 integrally attached to the valve body 41, the locking portion 45 formed at the lower end of the output shaft 44, and a tubular member **43*a* attached to the cap member 42**.

The cap member 42 according to the third embodiment is a cylindrical member integrally attached to the upper surface side of the valve body 41, similarly to the embodiments described above. As illustrated in FIG. 10, the upper portion of the cap member 42 according to the third embodiment narrows in a manner that the horizontal cross-sectional area decreases as it goes up, and the insertion hole **42*a* and a cutout portion 42*b* are formed on the upper surface of the cap member 42**.

Similarly to the embodiments described above, the end of the output shaft 44 is inserted into the insertion hole **42*a*. The opening area of the insertion hole 42*a* according to the third embodiment is formed to be larger than the horizontal cross-sectional area of the spherical locking portion 45 formed at the end of the output shaft 44**.

The cutout portion **42*b* is formed by cutting out the opening edge of the insertion hole 42*a* in a direction extending radially outward on the upper surface of the cap member 42. In the third embodiment, the lower end portion of the output shaft 44 is disposed inside the cylindrical cap member 42 via the cutout portion 42*b*, and the lower end of the output shaft 44 is in a state of being inserted into the insertion hole 42*a***.

Similarly to the second embodiment, the locking portion 45 according to the third embodiment is configured by the outer edge portion in the horizontal direction of the spherical portion formed at the lower end of the output shaft 44. The lower portion of the spherical portion in the output shaft 44 corresponds to the abutting projection **44*a*** in the third embodiment.

The tubular member **43*a* according to the third embodiment is formed in a cylindrical shape, and is attached so as to house the cap member 42 therein. Since the radial outer side of the cutout portion 42*b* of the cap member 42 is closed by the tubular member 43*a*, the tubular member 43*a* regulates the movement of the output shaft 44 so as to maintain the state where the lower end of the output shaft 44 is inserted into the insertion hole 42*a***.

As a result, in a case where the drive force from the drive motor 11 is transmitted and the output shaft 44 moves upward so as to be separated from the valve seat 63, the locking portion 45 of the output shaft 44 abuts on the periphery of opening edge of the insertion hole **42*a* in the cap member 42 from below. As described above, since the cap member 42 is integrally attached to the valve body 41, the drive force of the drive motor 11 is transmitted to the valve body 41 by the contact between the locking portion 45 of the output shaft 44 and the cap member 42**.

As a result, in the electric expansion valve 1 according to the third embodiment, the drive force of the drive motor 11 is transmitted to the valve body 41 via the joint portion 50, and the valve body 41 can be pulled upward so as to be separated from the valve seat 63.

The case where the drive force from the drive motor 11 is transmitted and the output shaft 44 moves downward so as to approach the valve seat 63 is similar to that in the embodiments described above, and thus, description thereof will not be repeated.

As a result, the electric expansion valve 1 according to the third embodiment can exhibit a function as an expansion valve in both the case where the refrigerant flows from the first inflow/outflow port 64 to the second inflow/outflow port 65 via the valve chamber 62 and the case where the refrigerant flows from the second inflow/outflow port 65 to the first inflow/outflow port 64 via the valve chamber 62.

As described above, according to the electric expansion valve 1 of the third embodiment, even in a case where the electric expansion valve 1 includes the spherical locking portion 45, the insertion hole **42*a*, the cap member 42 having the cutout portion 42*b*, and the tubular member 43*a***, it is possible to obtain the operational effects obtained from the configuration and operation common to the embodiments described above.

Fourth Embodiment

Next, a fourth embodiment different from the embodiments described above will be described with reference to FIG. 11. In the electric expansion valve 1 according to the fourth embodiment, the specific configuration of the centering mechanism 55 is different from that of the embodiments described above. Other configurations of the electric expansion valve 1 are similar to those of the embodiments described above, and thus description thereof will not be repeated.

The centering mechanism 55 of the embodiments described above includes the hemispherical abutting projection **44*a* curved in a manner that the axial center portion of the output shaft 44 is the lowest at the lower end of the output shaft 44, and the recess 41*a* with a conical internal shape in which the axial center portion of the valve body 41 is the deepest on the upper surface of the valve body 41**.

In this regard, the centering mechanism 55 according to the fourth embodiment is configured by the columnar abutting projection 44*a* formed to project downward at the lower end of the output shaft 44, and the recess 41*a* formed on the upper surface of the valve body 41.

Figure 11:
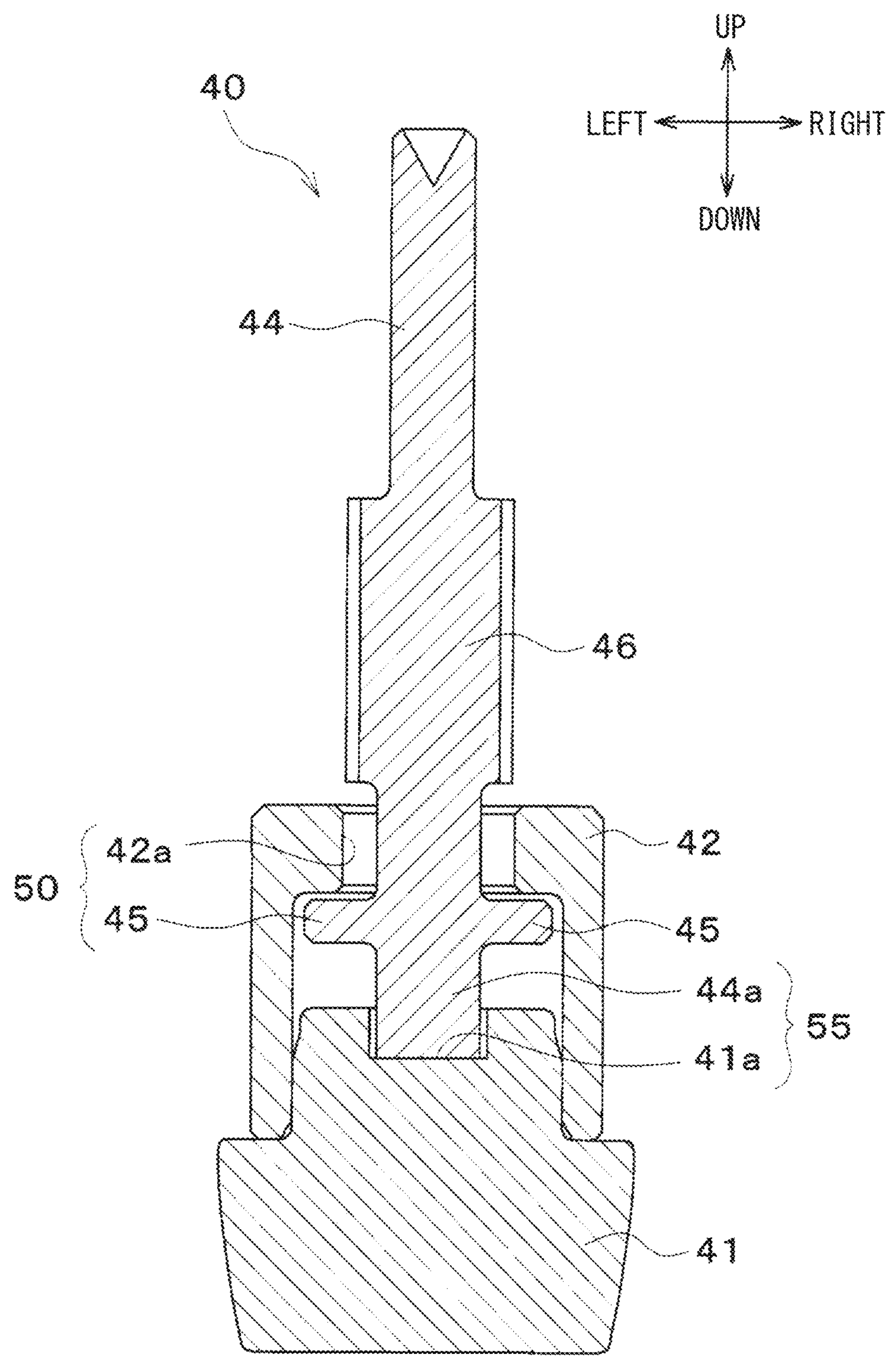
FIG. 11 is an enlarged cross-sectional view illustrating a configuration of a centering mechanism in an electric expansion valve according to a fourth embodiment.

As illustrated in FIG. 11, the abutting projection 44*a* of the output shaft 44 according to the fourth embodiment projects downward at the lower end of the output shaft 44, and is formed in a columnar shape centered on the axial center portion of the output shaft 44.

On the other hand, the recess 41*a* into which the abutting projection 44*a* of the output shaft 44 is fitted is formed on the upper surface of the valve body 41 according to the fourth embodiment. The recess 41*a* is formed by recessing the upper surface of the valve body 41 downward, and includes a columnar internal space centered on the axial center of the valve body 41. The internal space of the recess 41*a* is formed in a columnar shape slightly larger than the abutting projection 44*a* of the output shaft 44.

In the centering mechanism 55 according to the fourth embodiment configured as described above, in a case where the valve body 41 is pressed by the output shaft 44 (that is, in the case of the valve closing operation), the columnar abutting projection 44*a* is fitted into the recess 41*a* having the columnar internal space. The abutting projection 44*a* is formed in a columnar shape centered on the output shaft 44, and the recess 41*a* has a columnar internal space centered on the axial center of the valve body 41. Therefore, by fitting the abutting projection 44*a* into the recess 41*a*, the position of the output shaft 44 can be adjusted in a manner that the axial center of the output shaft 44 matches the axial center of the valve body 41.

Since the valve body 41 is pressed by the output shaft 44 in a state where the axial center of the valve body 41 and the axial center of the output shaft 44 match each other, the drive force transmitted to the output shaft 44 can be appropriately transmitted to the valve body 41, and the decompression function and the flow rate adjustment function of the electric expansion valve 1 can be reliably exhibited.

As described above, according to the electric expansion valve 1 of the fourth embodiment, even in a case where the centering mechanism 55 includes the columnar abutting projection 44*a* and the recess 41*a*, it is possible to obtain the operational effects obtained from the configuration and operation common to the embodiments described above.

Fifth Embodiment

Next, a fifth embodiment different from the embodiments described above will be described with reference to FIG. 12. In the electric expansion valve 1 according to the fifth embodiment, the specific configuration of the centering mechanism 55 is different from that of the embodiments described above. Other configurations of the electric expansion valve 1 are similar to those of the embodiments described above, and thus description thereof will not be repeated.

The centering mechanism 55 according to the fifth embodiment includes an abutting recess 44*b* formed on the lower surface of the output shaft 44 and a columnar projection 41*b* formed so as to project upward on the upper surface of the valve body 41.

Figure 12:
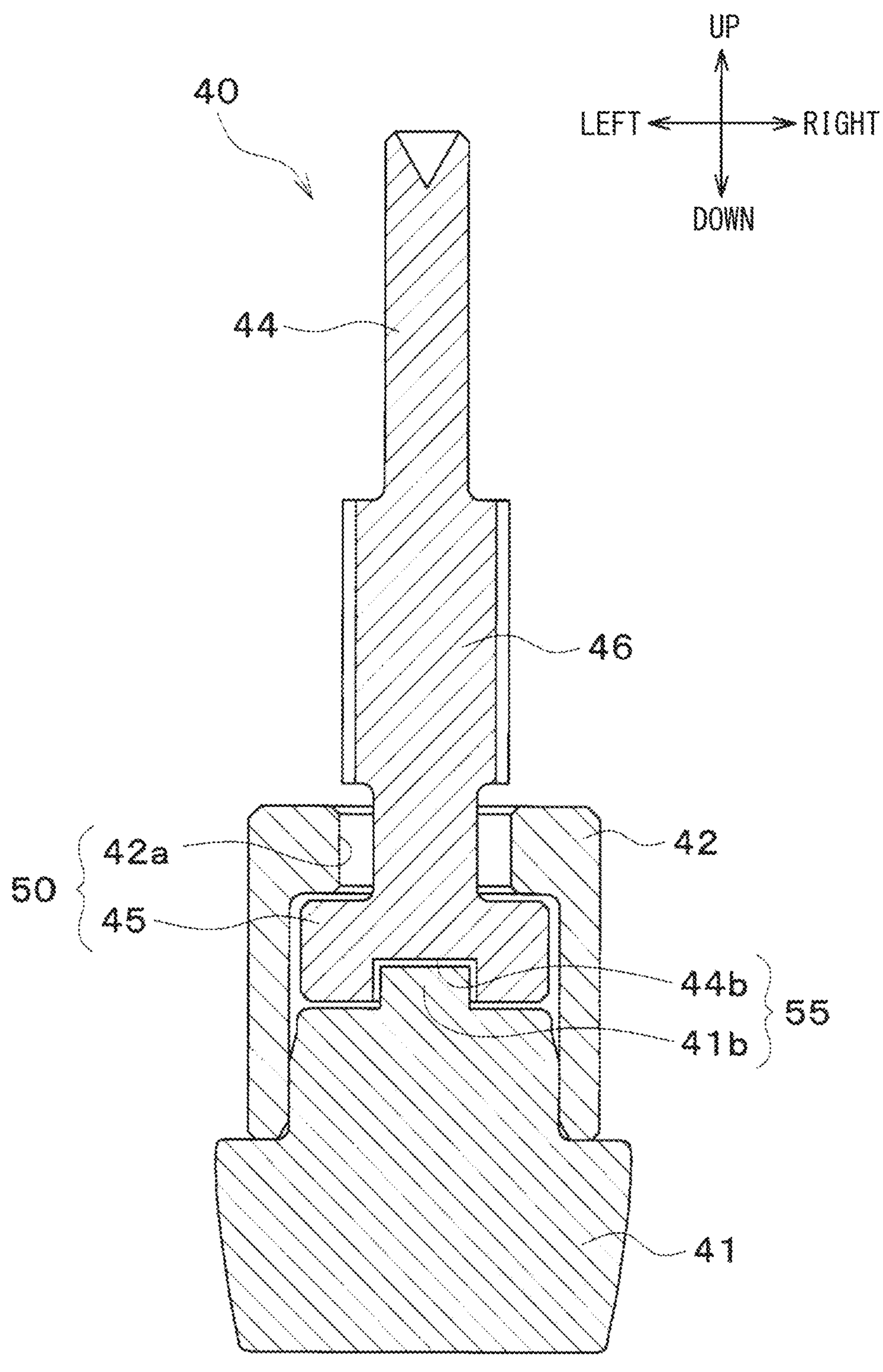
FIG. 12 is an enlarged cross-sectional view illustrating a configuration of a centering mechanism in an electric expansion valve according to a fifth embodiment.

As illustrated in FIG. 12, the abutting recess 44*b* of the output shaft 44 according to the fifth embodiment is formed by recessing the lower surface of the output shaft 44 upward, and has a columnar internal space centered on the axial center portion of the output shaft 44.

On the other hand, the projection 41*b* fitting into the abutting recess 44*b* of the output shaft 44 is formed on the upper surface of the valve body 41 according to the fifth embodiment. The projection 41*b* is formed by projecting the upper surface of the valve body 41 upward, and has a columnar shape centered on the axial center of the valve body 41. The projection 41*b* is formed in a columnar shape slightly smaller than the internal space of the abutting recess 44*b* of the output shaft 44.

In the centering mechanism 55 according to the fifth embodiment configured as described above, in a case where the valve body 41 is pressed by the output shaft 44 (that is, in the case of the valve closing operation), the columnar projection 41*b* is fitted into the abutting recess 44*b* having the columnar internal space. The internal space of the abutting recess 44*b* is formed in a columnar shape centered on the output shaft 44, and the projection 41*b* is formed in a columnar shape centered on the axial center of the valve body 41. Therefore, by fitting the projection 41*b* into the abutting recess 44*b*, the position of the output shaft 44 can be adjusted in a manner that the axial center of the output shaft 44 matches the axial center of the valve body 41.

Since the valve body 41 is pressed by the output shaft 44 in a state where the axial center of the valve body 41 and the axial center of the output shaft 44 match each other, the drive force transmitted to the output shaft 44 can be appropriately transmitted to the valve body 41, and the decompression function and the flow rate adjustment function of the electric expansion valve 1 can be reliably exhibited.

As described above, according to the electric expansion valve 1 of the fifth embodiment, even in a case where the centering mechanism 55 includes the abutting recess 44*b* having the columnar internal space and the projection 41*b*, it is possible to obtain the operational effects obtained from the configuration and operation common to the embodiments described above.

The present disclosure is not limited to the embodiments described above, and can be variously modified as follows without departing from the gist of the present disclosure.

The present disclosure is not limited to the embodiments described above, and can be variously modified as follows without departing from the gist of the present disclosure.

In the embodiments described above, the electric expansion valve 1 and the refrigeration cycle device 100 are applied to the refrigeration cycle of the vehicle air conditioner, but it is not limited to this aspect. The electric expansion valve 1 can be applied to any refrigeration cycle. For example, the electric expansion valve 1 may be applied to a refrigeration cycle for a residential facility.

The shape of the locking portion 45 of the output shaft 44 constituting the joint portion 50 is not limited to the shapes of the locking portion 45 in the embodiments described above. As the locking portion 45 in the present disclosure, various forms can be used as long as the locking portion has a portion extending larger than at least the maximum diameter of the insertion hole 42*a* in the cap member 42.

For example, the locking portion 45 may be formed by a plurality of projections projecting in a direction intersecting the axial center of the output shaft 44 and arranged to radially extend from the axial center of the output shaft 44. The projection amount of the projection in this case is determined to be larger than the maximum diameter of the insertion hole 42*a*.

The centering mechanism 55 in the present disclosure includes a recess formed either at the lower end of the output shaft 44 or on the upper surface of the valve body 41, and a projection formed either at the lower end of the output shaft 44 or on the upper surface of the valve body 41. The shapes of the recess and the projection constituting the centering mechanism 55 are not limited to the shapes in the embodiments described above. As the shapes of the recess and the projection in the centering mechanism 55, various shapes can be used as long as the position of the output shaft 44 can be adjusted in a manner that the axial center of the output shaft 44 matches the axial center of the valve body 41 by fitting of the recess and the projection.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An electric expansion valve comprising:
- a drive unit configured to generate drive force upon receiving supply of electric power;
- an output shaft configured to rotate about an axis by drive force output from the drive unit and translate in conjunction with rotation of the output shaft;
- a main body including a first inflow/outflow port through which a refrigerant of a refrigeration cycle flows, a second inflow/outflow port formed at a position different from the first inflow/outflow port, a valve chamber disposed in a refrigerant passage connecting the first inflow/outflow port and the second inflow/outflow port, and a valve seat disposed inside the valve chamber;
- a valve body disposed within the valve chamber to open and close an opening of the valve seat;
- a joint portion configured to connect an end of the output shaft and the valve body to be integrally displaceable; and
- a centering mechanism configured to adjust to align an axial center of the output shaft with an axial center of the valve body, wherein
- the joint portion includes
  - a cap member integrally attached to the valve body and having an insertion hole into which the output shaft is inserted, and
  - a locking portion expanding from an end part of the output shaft to be larger than at least a maximum diameter of the insertion hole,
- in a case where the output shaft is displaced toward the valve seat, an end of the output shaft is configured to press the valve body to approach the valve seat in a state where the output shaft is inserted into the insertion hole,
- in a case where the output shaft is displaced away from the valve seat, the locking portion is configured to contact an opening edge of the insertion hole to separate the valve body from the valve seat,
- the centering mechanism includes
  - a projection formed on one of the end of the output shaft and a surface of the valve body facing the end of the output shaft, the projection being shaped into a semispherical shape protruding from the output shaft or the valve body, and
  - a recess formed on the other of the end of the output shaft and the surface of the valve body, the recess being shaped to be engaged with the projection and into a conical shape having a vertex at the axial center of the output shaft or the axial center of the valve body, and
- the projection and the recess are configured to align the axial center of the output shaft with the axial center of the valve body by engaging with each other.

2. A refrigeration cycle device comprising
- a refrigeration cycle including a compressor configured to compress and discharge a refrigerant, a radiator configured to radiate heat of the high-pressure refrigerant discharged from the compressor, an electric expansion valve configured to decompress the refrigerant flowing out of the radiator, and an evaporator configured to evaporate the refrigerant decompressed by the electric expansion valve, wherein
- the electric expansion valve includes
  - a drive unit configured to generate drive force upon receiving supply of electric power,
  - an output shaft configured to rotate about an axis by drive force output from the drive unit and translate in conjunction with rotation of the output shaft,
  - a main body including a first inflow/outflow port through which a refrigerant of a refrigeration cycle flows, a second inflow/outflow port formed at a position different from the first inflow/outflow port, a valve chamber disposed in a refrigerant passage connecting the first inflow/outflow port and the second inflow/outflow port, and a valve seat disposed inside the valve chamber,
  - a valve body disposed within the valve chamber to open and close an opening of the valve seat,
  - a joint portion configured to connect an end of the output shaft and the valve body to be integrally displaceable, and
  - a centering mechanism configured to adjust to align an axial center of the output shaft with an axial center of the valve body,
- the refrigeration cycle device is switchable between
  - a first operation mode in which the refrigerant of the refrigeration cycle flows from the first inflow/outflow port to the second inflow/outflow port via the refrigerant passage and the valve chamber, and
  - a second operation mode in which the refrigerant of the refrigeration cycle flows from the second inflow/outflow port to the first inflow/outflow port via the refrigerant passage and the valve chamber,
- the joint portion includes
  - a cap member integrally attached to the valve body and having an insertion hole into which the output shaft is inserted, and
  - a locking portion expanding from an end part of the output shaft to be larger than at least a maximum diameter of the insertion hole,
- in a case where the output shaft is displaced toward the valve seat, an end of the output shaft is configured to press the valve body to approach the valve seat in a state where the output shaft is inserted into the insertion hole,
- in a case where the output shaft is displaced away from the valve seat, the locking portion is configured to contact an opening edge of the insertion hole to separate the valve body from the valve seat,
- the centering mechanism includes
  - a projection formed on one of the end of the output shaft and a surface of the valve body facing the end of the output shaft, the projection being shaped into a semispherical shape protruding from the output shaft or the valve body, and
  - a recess formed on the other of the end of the output shaft and the surface of the valve body, the recess being shaped to be engaged with the projection and into a conical shape having a vertex at the axial center of the output shaft or the axial center of the valve body, and the projection and the recess are configured to align the axial center of the output shaft with the axial center of the valve body by engaging with each other.

* * * * *